US006606864B2

(12) United States Patent
MacKay

(10) Patent No.: US 6,606,864 B2
(45) Date of Patent: *Aug. 19, 2003

(54) ADVANCED MULTI PRESSURE MODE GAS TURBINE

(76) Inventor: Robin MacKay, 6626 Locklenna La., Rancho Palos Verdes, CA (US) 90275

( * ) Notice: Subject to any disclaimer, the term of this patent is extended or adjusted under 35 U.S.C. 154(b) by 29 days.

This patent is subject to a terminal disclaimer.

(21) Appl. No.: 10/060,239
(22) Filed: Feb. 1, 2002

(65) Prior Publication Data
US 2002/0152754 A1 Oct. 24, 2002

Related U.S. Application Data

(63) Continuation-in-part of application No. 09/935,207, filed on Aug. 21, 2001.
(60) Provisional application No. 60/268,387, filed on Feb. 13, 2001.

(51) Int. Cl.[7] .................................. F02C 7/057
(52) U.S. Cl. ..................... 60/773; 60/39.41; 60/801
(58) Field of Search ................. 60/772, 773, 39.41, 60/793, 801, 39.511

(56) References Cited

U.S. PATENT DOCUMENTS

| 4,280,327 A | | 7/1981 | Mackay | |
|---|---|---|---|---|
| 4,347,711 A | | 9/1982 | Noe et al. | |
| 5,148,670 A | * | 9/1992 | Birch et al. | 60/787 |
| 5,323,603 A | * | 6/1994 | Malohn | 60/784 |
| 6,023,135 A | | 2/2000 | Gilbreth et al. | |
| 6,031,294 A | | 2/2000 | Geis et al. | |
| 6,298,654 B1 | * | 10/2001 | Vermes et al. | 60/774 |

OTHER PUBLICATIONS

SAE Technical Paper Series 940510, "Development of a 24 kW Gas Turbine–Driven Generator Set for Hybrid Vehicles" by Robin Mackay, 2–28/3–3/94.
SAE Technical Paper Series 930044, "Hybrid Vehicle Gas Turbines" by Robin Mackay, 3/1–5/94.
PB84–148071 "Phase II Development Brayton/Rankine 10–Ton Gas–Fired Space Conditioning Program", May 1983.
1964 Gas Turbine Catalog, Gas Turbine Manufacturers, Ford Motor Company, "Turbocharged Gas Turbines", 1964.

* cited by examiner

Primary Examiner—Ehud Gartenberg
(74) Attorney, Agent, or Firm—Albert J. Miller

(57) ABSTRACT

A gas turbine which is capable of operating in more than one pressure mode. The gas turbine, which may include a single fixed spool, multiple fixed spools, or a combination of fixed spool(s) and a free turbine, can operate in a positive pressure mode, a transatmospheric mode, or a subatmospheric mode. Valving is provided to control the particular pressure mode of operation in response to system requirements and to switch between pressure modes as required. The gas turbine is particularly useful with a catalytic combustor where the gas turbine can be started in a mode where the catalytic combustor, and its associated preheater, is at or below atmospheric pressure.

20 Claims, 18 Drawing Sheets

ADVANCED MULTI PRESSURE MODE GAS TURBINE

PRIORITY INFORMATION

This application is a continuation-in-part of U.S. Application Ser. No. 09/935,207 filed Aug. 21, 2001, which claims the benefit of U.S. Provisional Application Serial No. 60/268,387 filed Feb. 13, 2001, the entire disclosures of which are incorporated herein by reference.

TECHNICAL FIELD

This invention relates to the general field of gas turbines and more particularly to a gas turbine operating in more than one pressure mode.

BACKGROUND OF THE INVENTION

A gas turbine would include a turbine, a compressor, and a combustor, plus a recuperator (heat exchanger) where higher efficiencies are desired in low pressure ratio gas turbines. Basically, air is compressed in the compressor, heated in the recuperator, mixed with fuel and burned in the combustor, and then expanded in the turbine. The turbine drives the compressor and the turbine exhaust or discharge provides the heat for the recuperator to heat the compressed air from the compressor.

With high power-to-weight ratios, high reliability, and low maintenance, gas turbines dominate commercial and military aircraft propulsion. They also dominate aircraft auxiliary power units and large military tank propulsion. But when it comes to commercial and personal land vehicles, such as buses, trucks and passenger cars, gas turbine applications have been extremely limited.

While virtually every automobile and small gas turbine manufacturer in the United States, Europe and Japan has built and tested gas turbine propulsion prototypes, none have seen production in commercially viable quantities. The problems have always been initial cost, fuel consumption, and response time.

When a gas turbine is used with an electrical generator, the combination is generally referred to as a turbogenerator; with the smaller versions called a microturbine. In a microturbine, the generator would normally be a permanent magnet rotor rotatably driven by the turbine within an electrical winding stator.

Microturbines are being successfully used in production commercial land vehicles. The Capstone Turbine Corporation of Chatsworth, Calif. now produces a microturbine, which is the primary source of power in hybrid electric buses and similar vehicles. These microturbines are economically sound while demonstrating long life with dramatically reduced maintenance and emissions. While production of these vehicles is still limited today, it is increasing and the microturbine is being proven in over-the-road revenue service.

However, to reach high production in a broad range of vehicles, including passenger cars, it is recognized that certain improvements will be needed. These include lower initial cost, significantly faster response time, and higher efficiency into the forty percent (40%) range at both full load and part load.

So why are microturbines successful in hybrid electric buses? First of all, cost is far less of an issue because electric buses are expensive and microturbines are a small percentage of the cost. In addition, electric buses have limited range, especially when air-conditioned. They must carry batteries that are typically one third of the weight of the bus. Microturbines provide essentially unlimited range, even when the air conditioning is on, and allow for a smaller, lighter, less expensive battery pack.

Next, the traditional problem of fuel consumption is greatly ameliorated because the microturbine can always operate at its most efficient point. Even when the bus is stopped, the output can be used to charge the batteries. In addition, the microturbine can be relatively small as it need only provide the average power. Most of the peak power required to accelerate the bus comes from the battery. The net result is that fuel consumption is typically one half and sometimes one third of that of conventional buses. Additionally, the problem of response time is eliminated because the battery provides the surge of power necessary to accommodate sudden loads.

It must also be recognized that the single most important attribute of the microturbine is its low emission levels. The California Air Resources Board (CARB) has approved fourteen manufacturers to sell heavy-duty diesel engines under 400 hp in California. NOx emissions of the best of these engines range between 3.2 and 3.8 g/bhp/hr. CARB has certified the diesel-fueled Capstone Turbine microturbine at less than one quarter of these levels or 0.7 g/bhp/hr using no catalysts or after treatment, where "g" represents grams, "bhp" is brake horsepower and "hr" is hours.

Similarly, CARB has certified ten manufacturers to sell natural gas and LPG fueled engines. The NOx emissions of the best of these engines range between 1.3 and 2.4 g/bhp/hr or roughly double that of the Capstone Turbine microturbine operating on diesel. CARB has certified the Capstone microturbine at 0.53 g/bhp/hr on LPG and 0.26 g/bhp/hr on natural gas.

Microturbines have also been successfully applied in a wide range of applications other than hybrid vehicles with over one thousand seven hundred Capstone Turbine units delivered to date.

Capstone has shipped more than 1,700 microturbines to customers worldwide and these microturbines have logged more than 1,000,000 hours of commercial operation. Individual units have run for more than 20,000 hours in non-vehicular applications, such as distributed generation, with no maintenance other than fuel filter and air filter changes, with some of these runs at maximum output. Considering if these units were powering automobiles at only 80 kph (50 mph), this would be the equivalent of running 1,600,000 kilometers (1,000,000 miles) with essentially zero maintenance.

Existing microturbines drive permanent magnet generators that are integrated into the basic design and therefore have no mechanical drive capabilities. Fortunately, electric propulsion systems are now well developed and very efficient over a broad range of speeds. In any event, much and sometimes most of the energy consumed by a bus is for auxiliaries such as air conditioning, air compressors, lights and fans that can be driven electrically. And the thrust in all vehicles, including automobiles, is towards larger electric loads as all-electric power steering, power brakes and other auxiliaries are developed.

Hybrid electric buses are an excellent application for existing microturbines and batteries. However, if production of microturbines is to reach automotive quantities, the bulk, weight and cost of the battery pack must go. When the microturbine has to operate without an energy storage system (battery), higher efficiency at full load will be needed. But, even more important, with no battery, much higher efficiency at part load will be critical. In addition, the response time must be improved and the initial cost must drop.

For purposes of discussion, all calculations will be based on the following assumptions unless otherwise noted:

| | |
|---|---|
| Ambient temperature: | 15° C. (59° F.) |
| Air flow | 0.600 kg/sec (1.323 lb/sec) |
| Compressor pressure ratio | 4.00:1 |
| Turbine pressure ratio: | 3.76:1 |
| Turbine Inlet temperature: | 875° C. (1607° F.) |
| Compressor efficiency: | 0.780 |
| Turbine efficiency: | 0.850 |
| Recuperator effectiveness: | 0.850 |
| Combustor efficiency: | 0.995 |
| Mechanical efficiency: | 0.990 |
| Generator & inverter efficiency: | 0.900 |
| Radiation losses: | 0.005 |
| Compressor bleed: | 0.000 |
| Fuel: | #2 diesel |

No allowance is made for change in pressure drop due to differences in recuperator effectiveness, as this is a function of recuperator design.

A microturbine using the above parameters would produce 74.3 kW at thirty-one and one half percent (31.5%) efficiency. While the microturbine is a very simple device conceptually, in practice, it has very sophisticated engineering. Thus, except for the fuel pump and possibly a cooling fan for the electronics, the only moving part is the rotor group, which includes the turbine wheel, compressor wheel and permanent magnet rotor. When the rotor group or spool is mounted on compliant foil fluid film bearings, there is no lubrication system and, indeed, no oil, no oil pump, no oil cooler and no need for oil servicing. As the microturbine is air cooled, there are no fluids in the machine other than fuel, and no turbine-driven accessories. This creates a compact package that operates over a limited speed range and is well suited to vehicles using electric propulsion.

In large gas turbines, the roads to high power and efficiency are: 1) increasing component efficiencies, 2) increasing pressure ratios, and 3) increasing turbine inlet temperatures. Unfortunately for small gas turbines such as microturbines, efficiencies of small components will never be as high as those of large components. Also compressors with small airflows cannot be designed with as high a pressure ratio as compressors with large airflows, and still be efficient. Finally, the turbine inlet temperature is limited by the use of the recuperator that small gas turbines must use if they wish to have competitive efficiencies.

Using a recuperator, a heat exchanger that transfers heat from the gas turbine's exhaust to the compressor discharge air before this air goes into the combustor, microturbine efficiency can be improved by reducing the fuel required. The ratio of recuperator air inlet temperature minus compressor discharge temperature to turbine discharge temperature minus compressor discharge temperature is known as recuperator effectiveness. Eighty-five percent (85%) is a typical goal and in a typical small gas turbine, this will halve the fuel consumption or double the efficiency.

The disadvantages to using recuperators are: 1) they are heavy, often doubling the weight of the microturbine, 2) they are expensive, far and away the most expensive component in the microturbine and 3) they are limited in the temperature that they can take. As the recuperator inlet temperature is the same as the turbine discharge temperature, the turbine discharge temperature must also be limited. As the turbine inlet temperature is related to the turbine discharge temperature by the pressure ratio and turbine efficiency, the turbine inlet temperature must also be limited. This effect is even more pronounced at part loads where the rpm is reduced thus lowering the pressure ratio. Limiting the turbine inlet temperature limits the power and efficiency of the microturbine.

SUMMARY OF THE INVENTION

The present invention is directed to a gas turbine that operates in more than one pressure mode. During various system operating requirements, the gas turbine may operate in a positive pressure mode, a transatmospheric pressure mode, or a subatmospheric pressure mode. Valving is provided to control the particular pressure mode of operation in response to system requirements and to switch between pressure modes as required. The gas turbine may include a single fixed spool, multiple fixed spools, or a combination of fixed spool(s) and a free turbine. In addition, the gas turbine can be started in a mode at or below atmospheric pressure mode and can utilize a catalytic combustor.

BRIEF DESCRIPTION OF THE DRAWINGS

Figure 1:
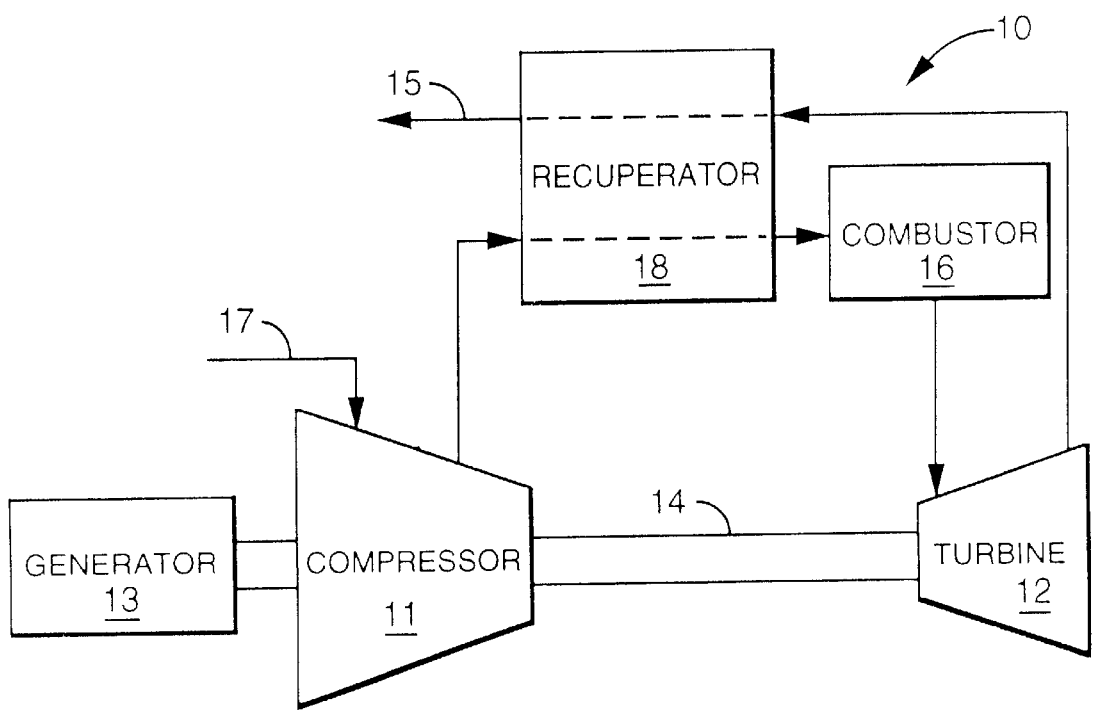
Figure 2:
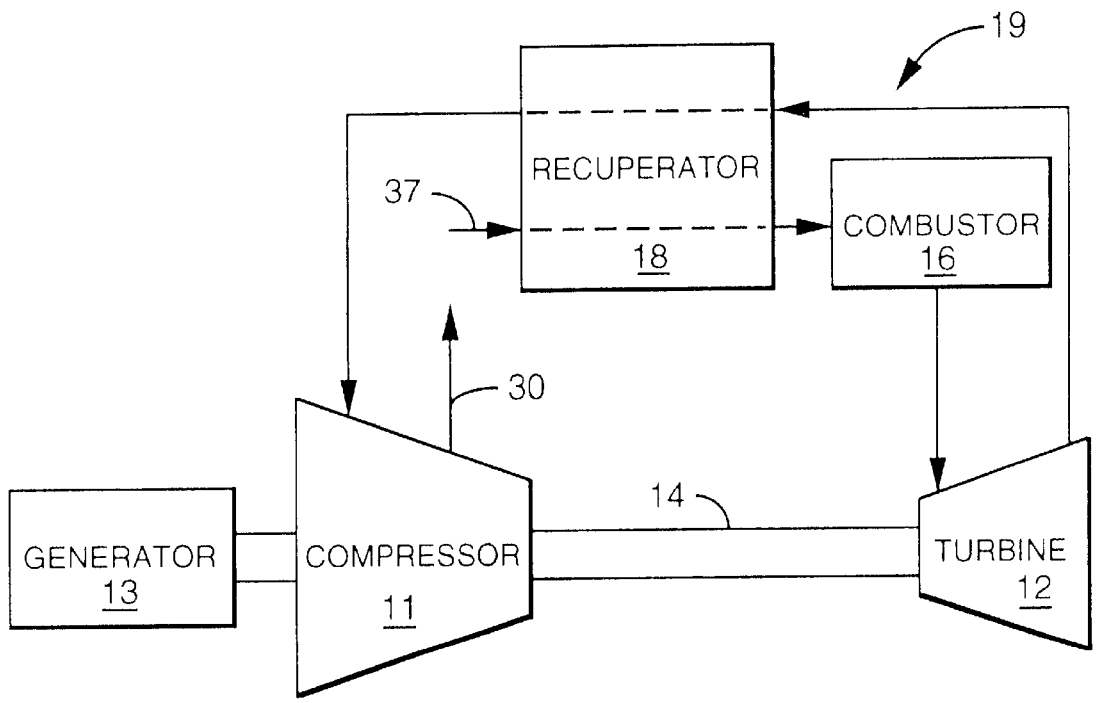
Figure 3:
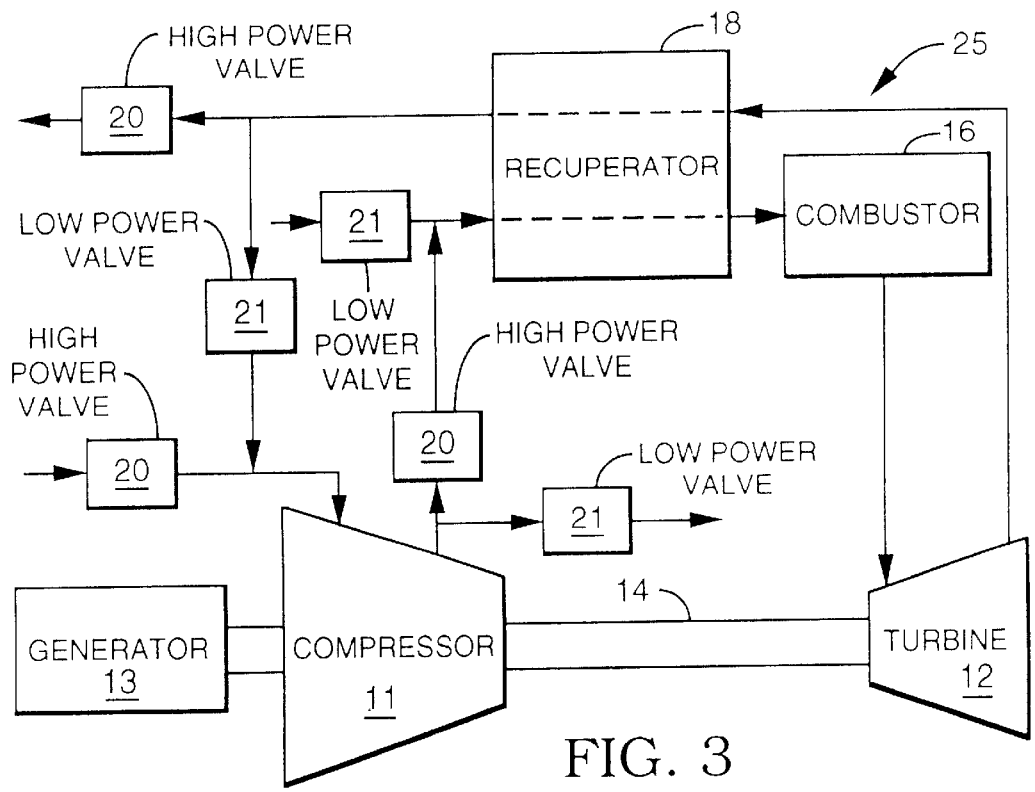
Figure 4:
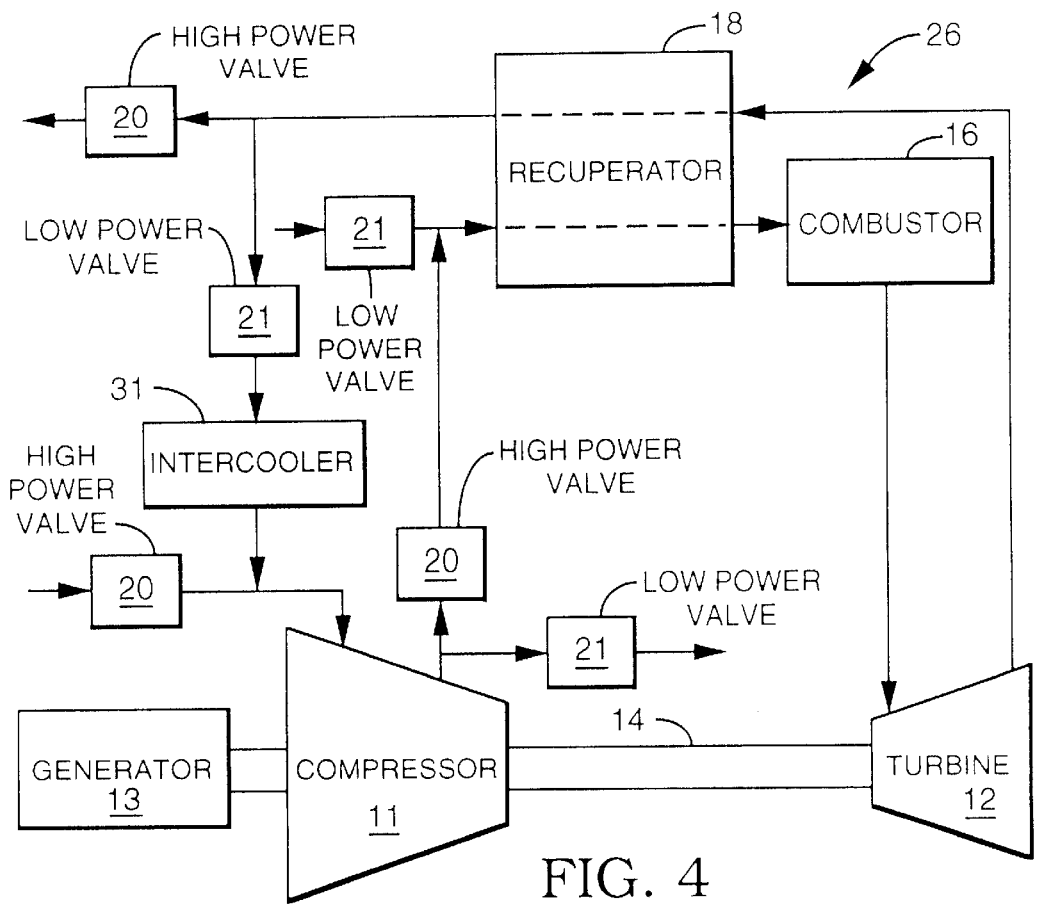
Figure 5:
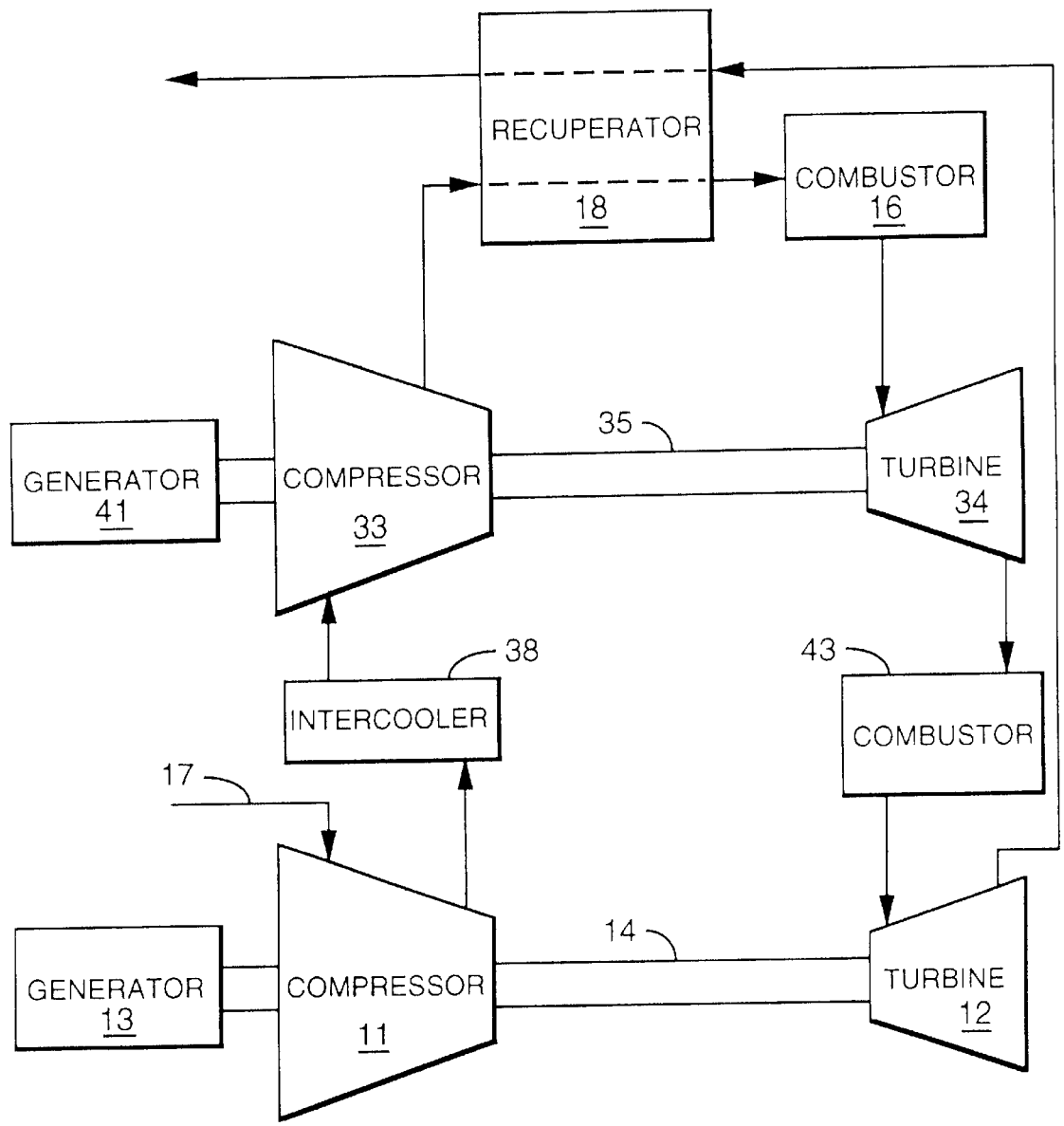
Figure 6:
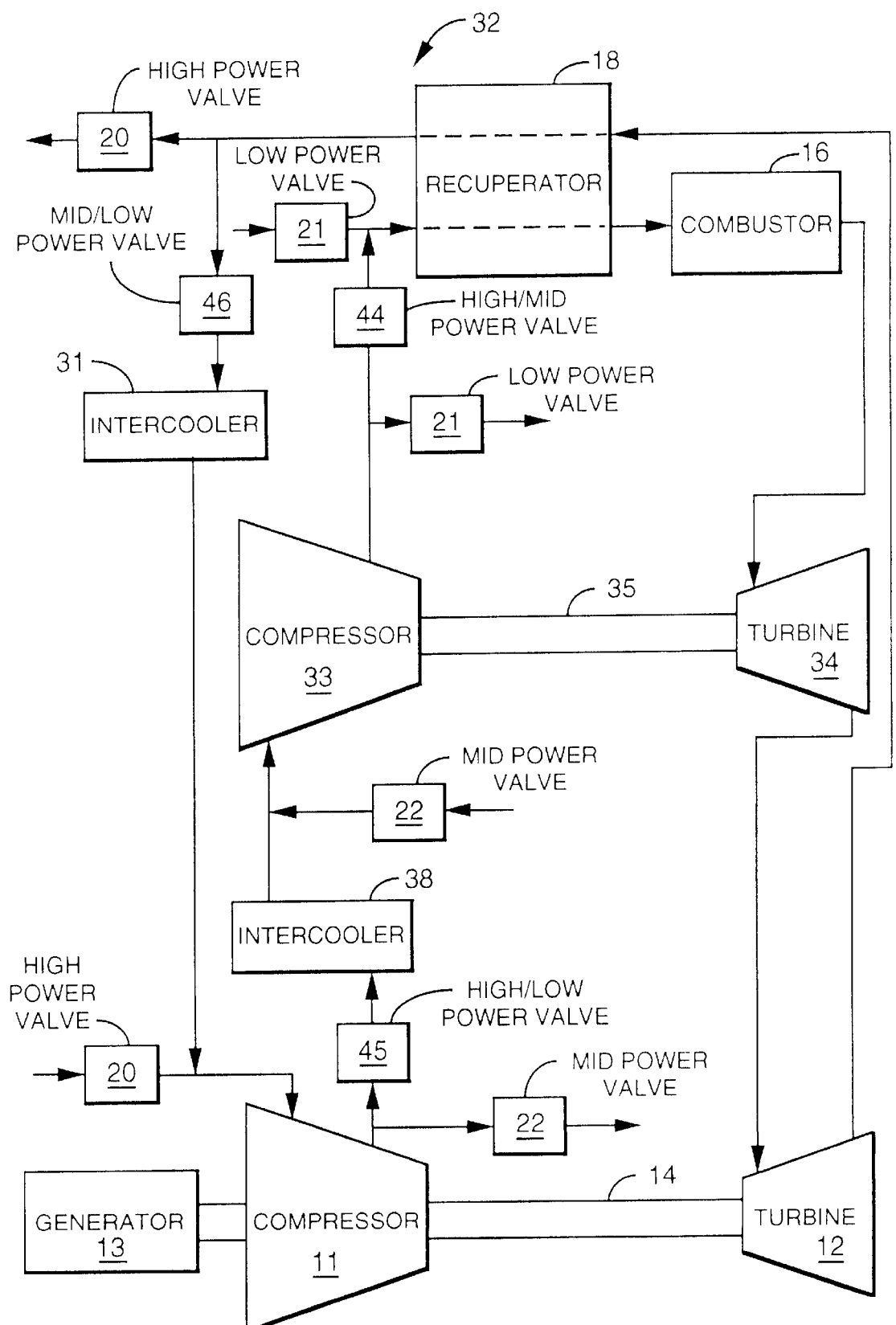
Figure 7:
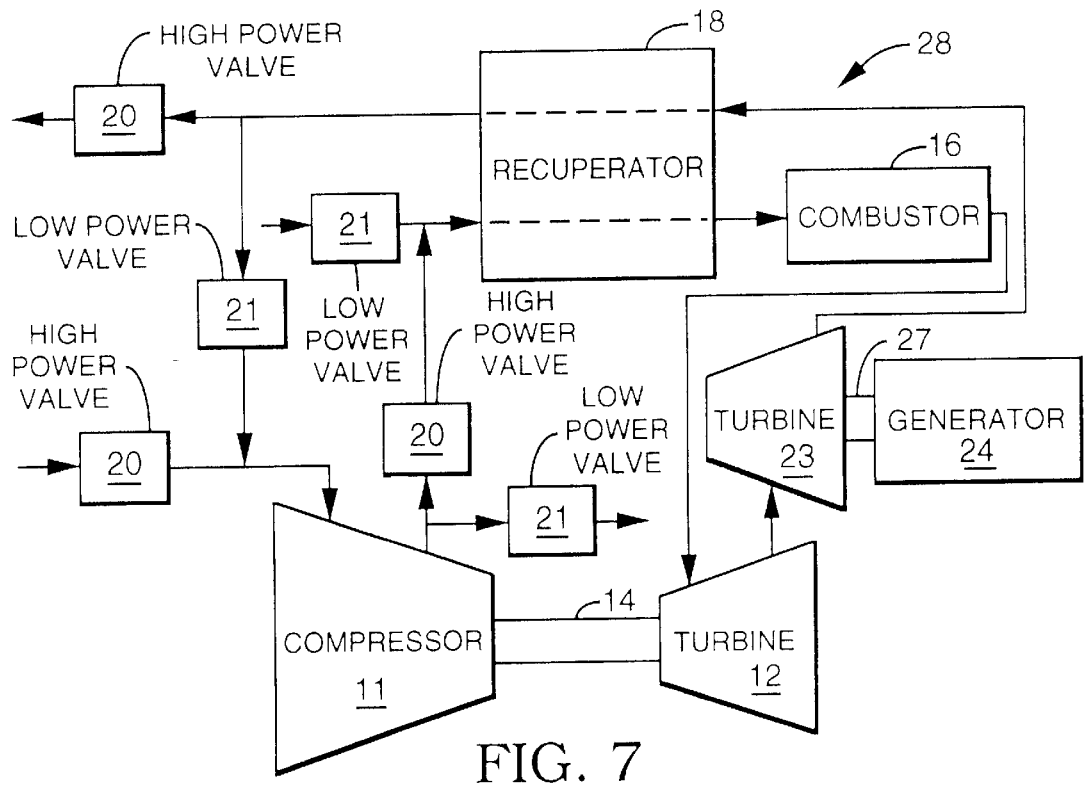
Figure 8:
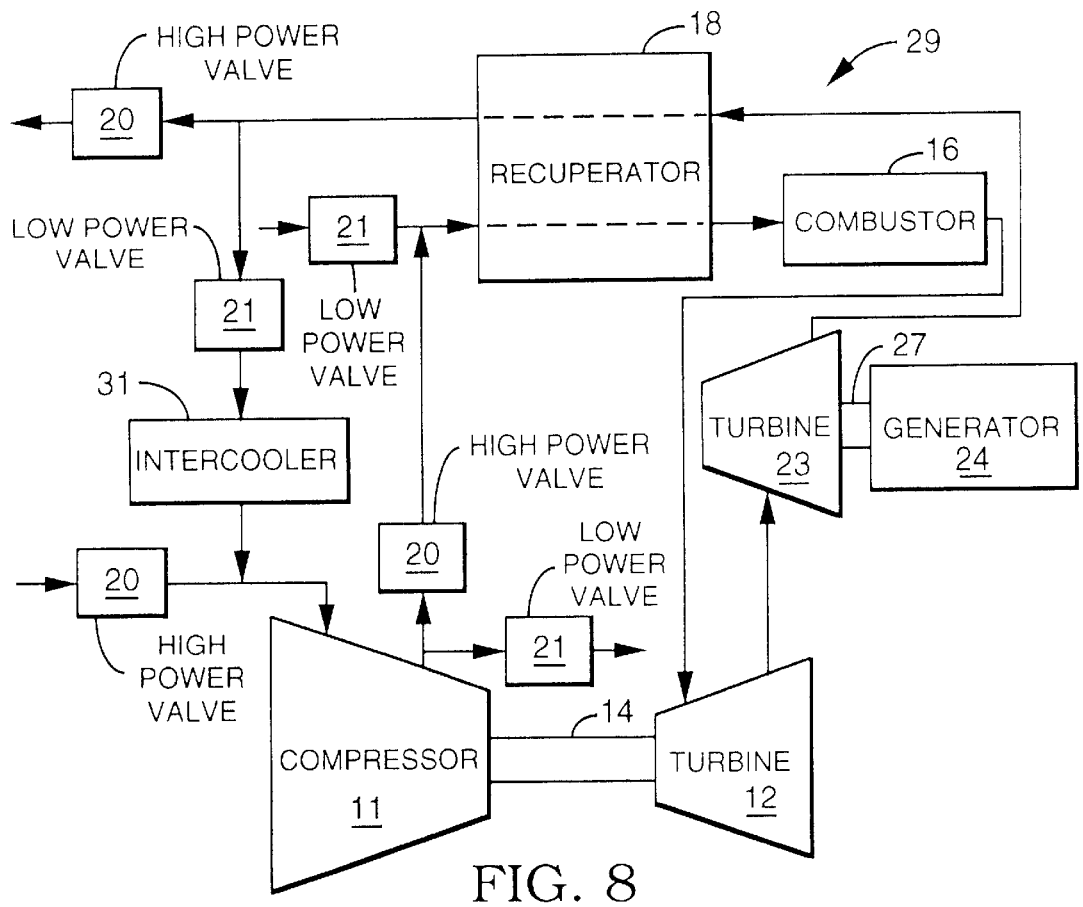
Figure 9:
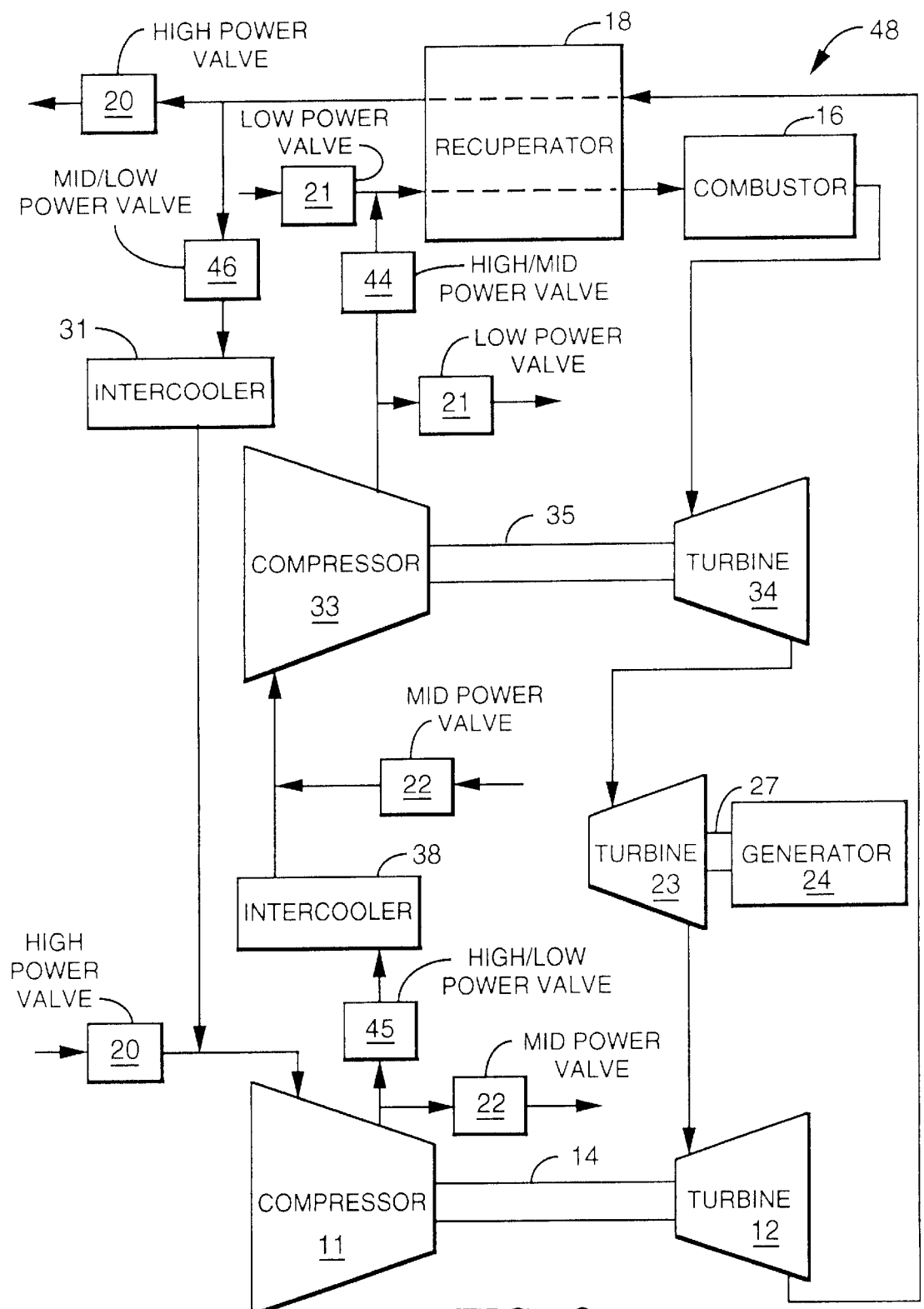
Figure 10:
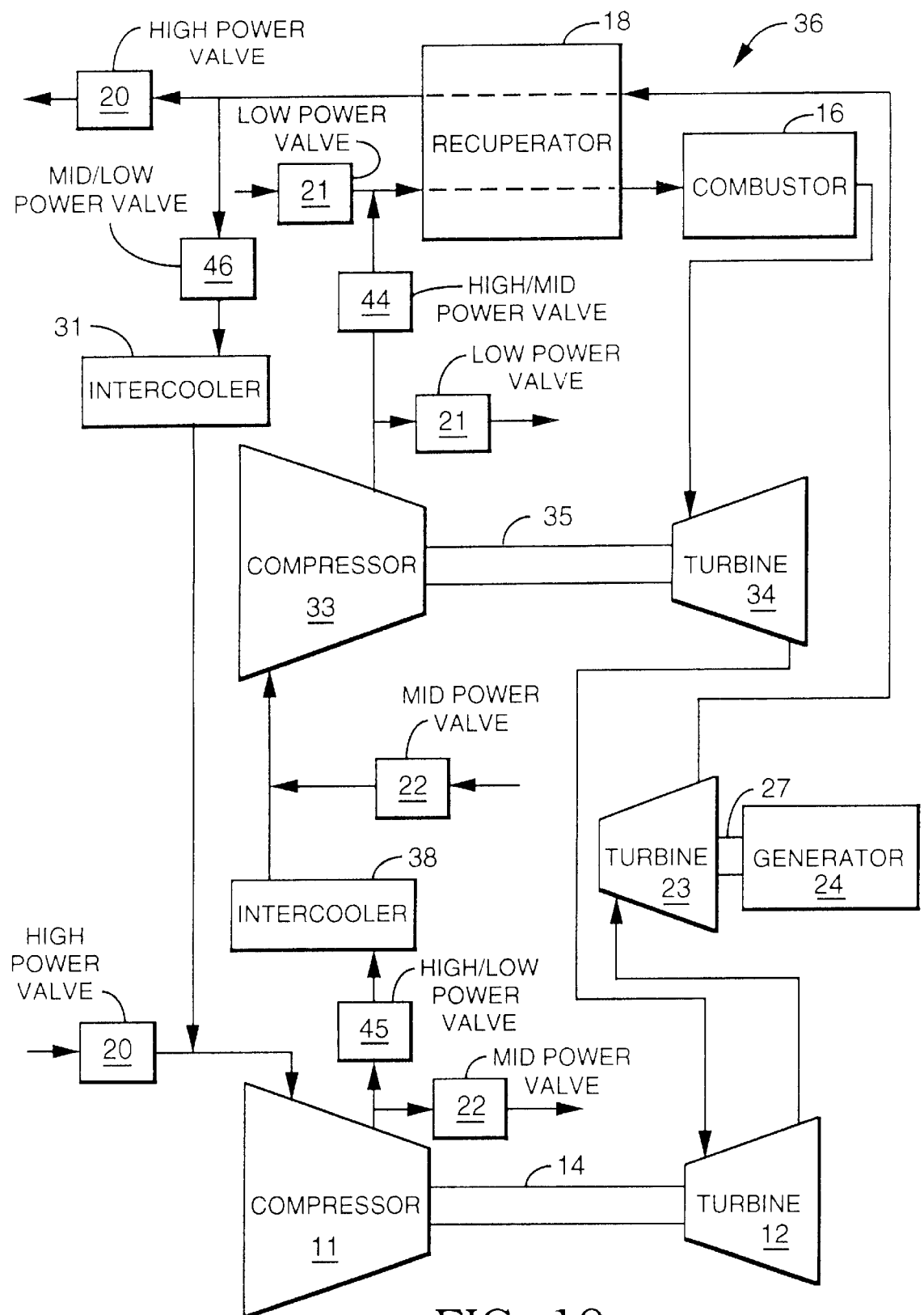
Figure 11:
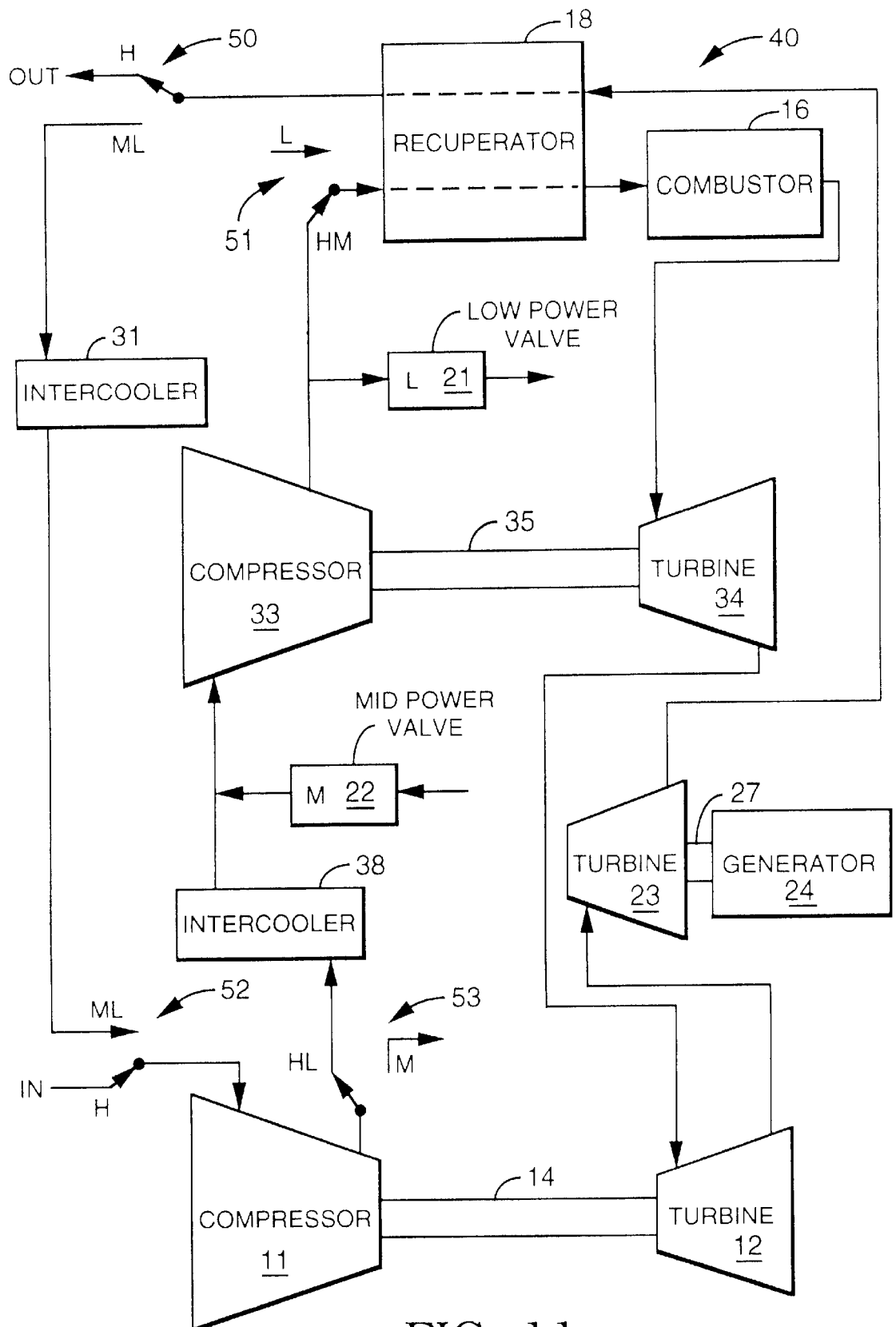
Figure 12:
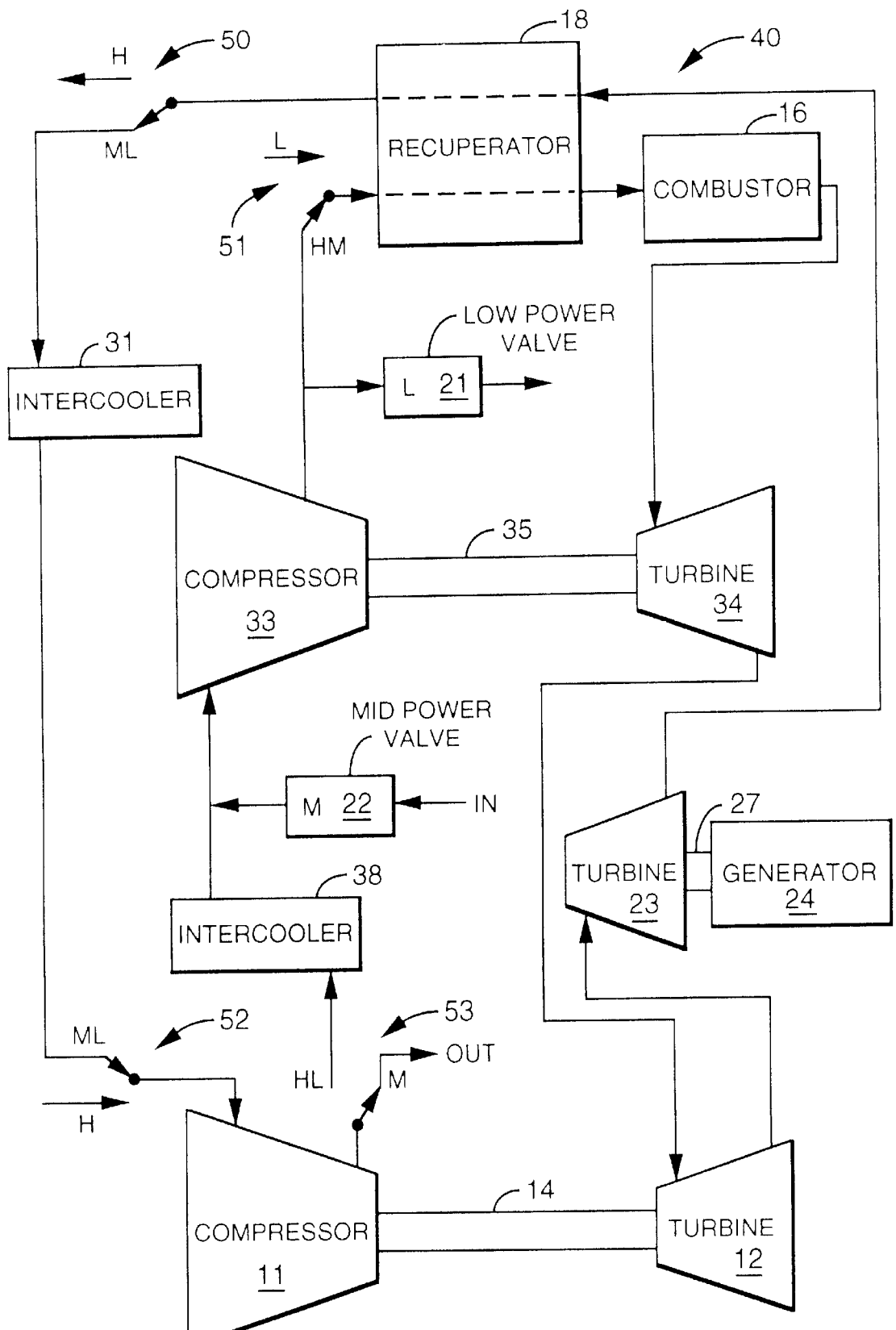
Figure 13:
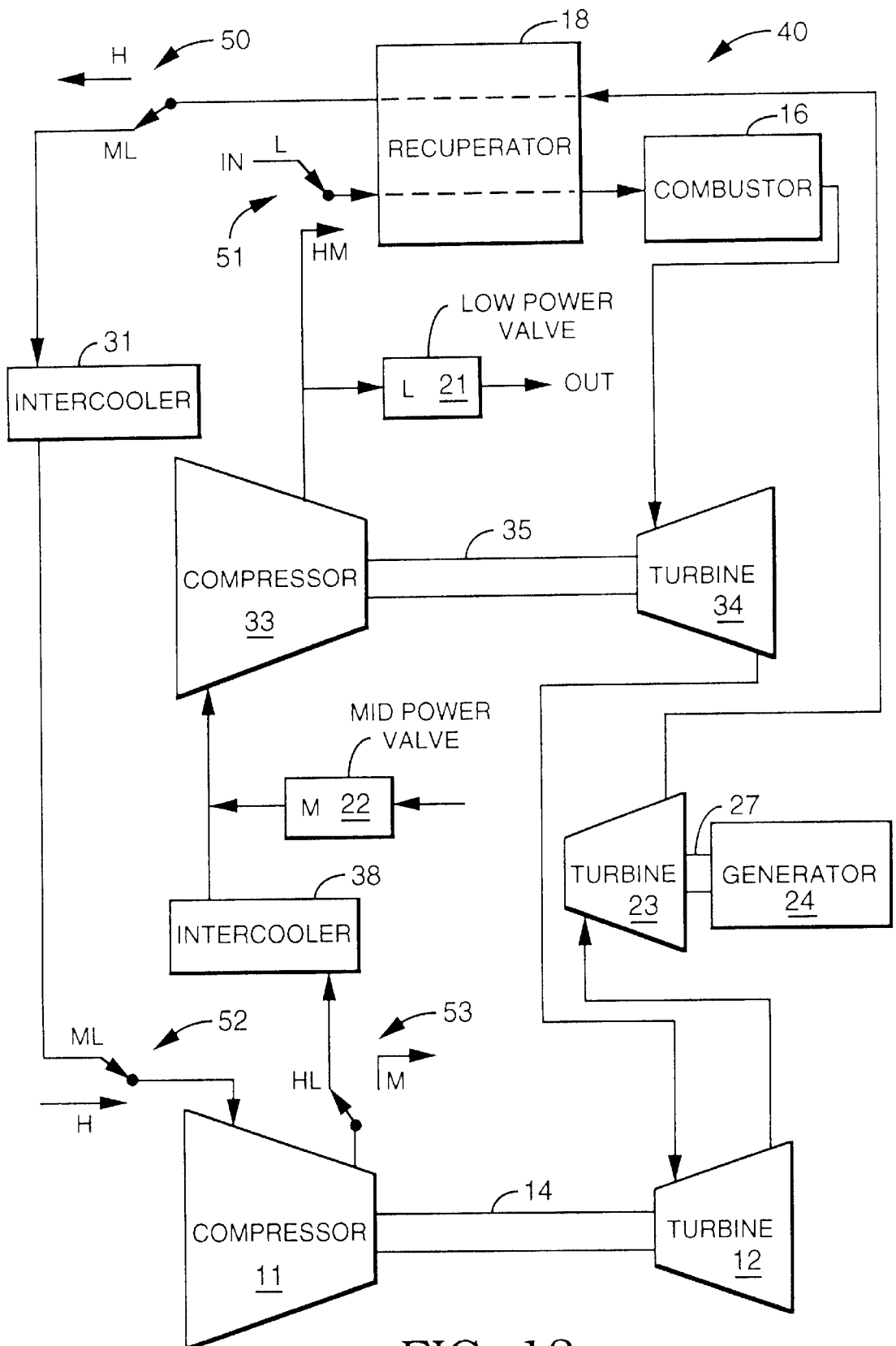
Figure 14:
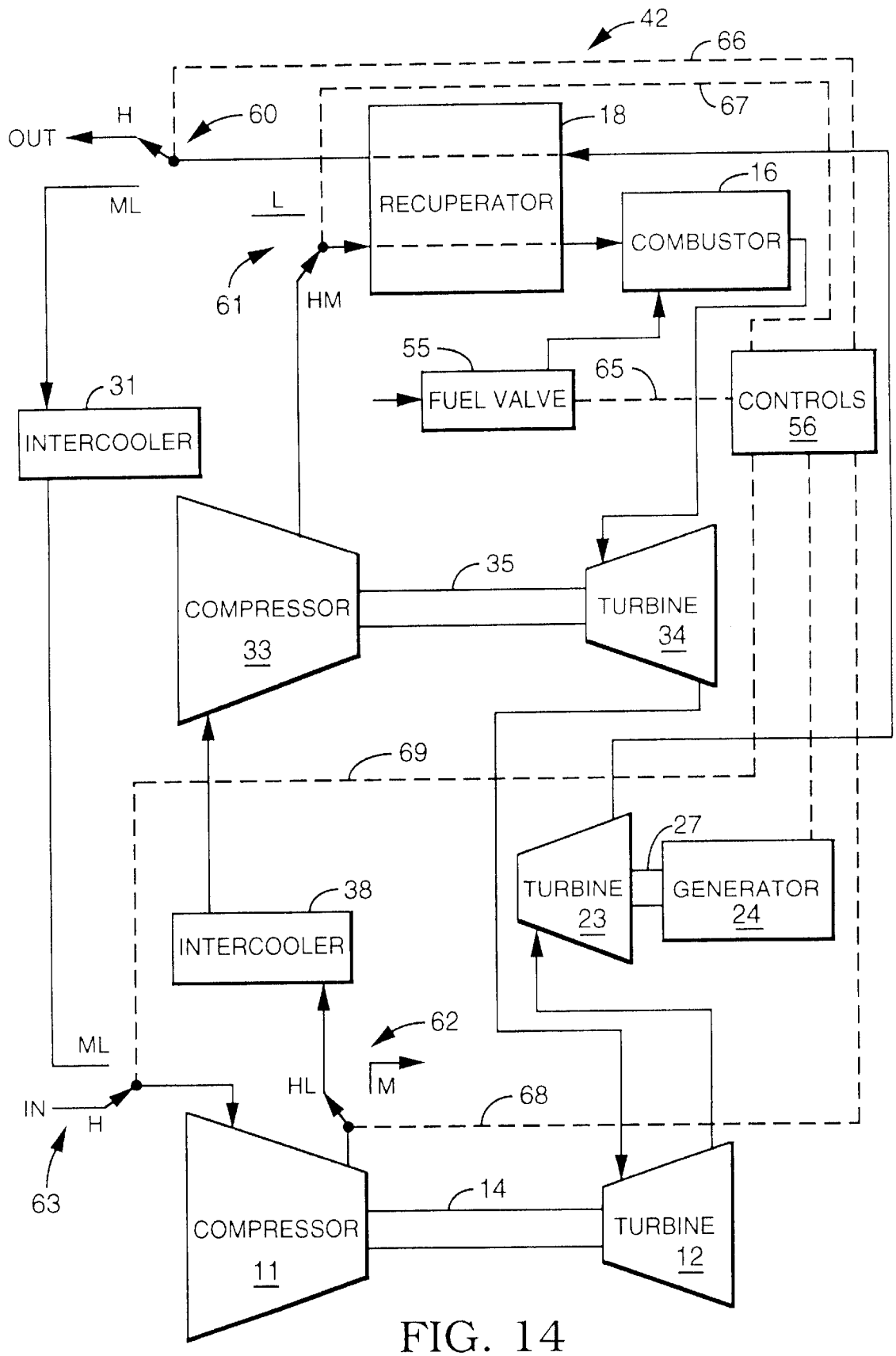
Figure 15:
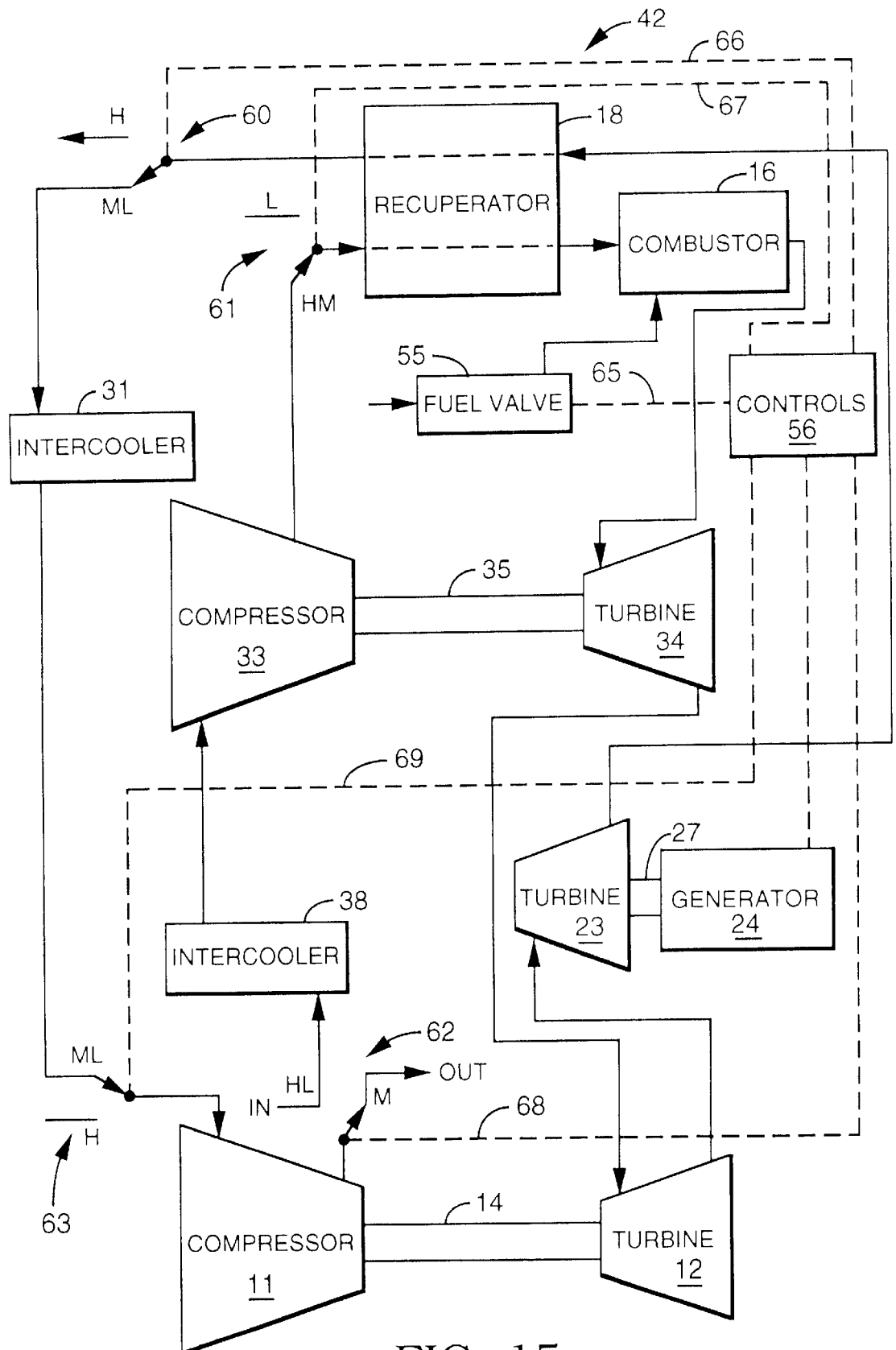
Figure 16:
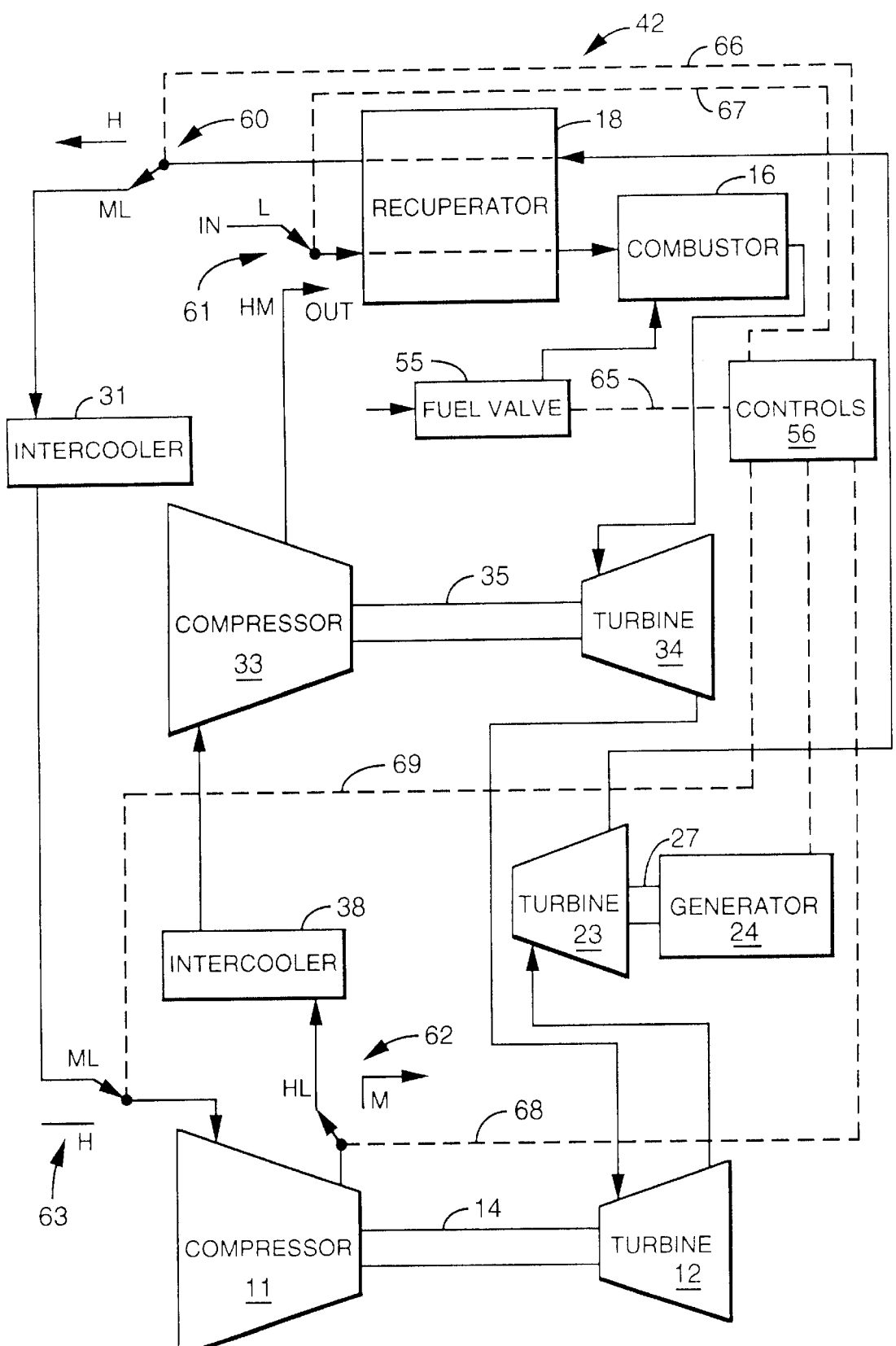
Figure 17:
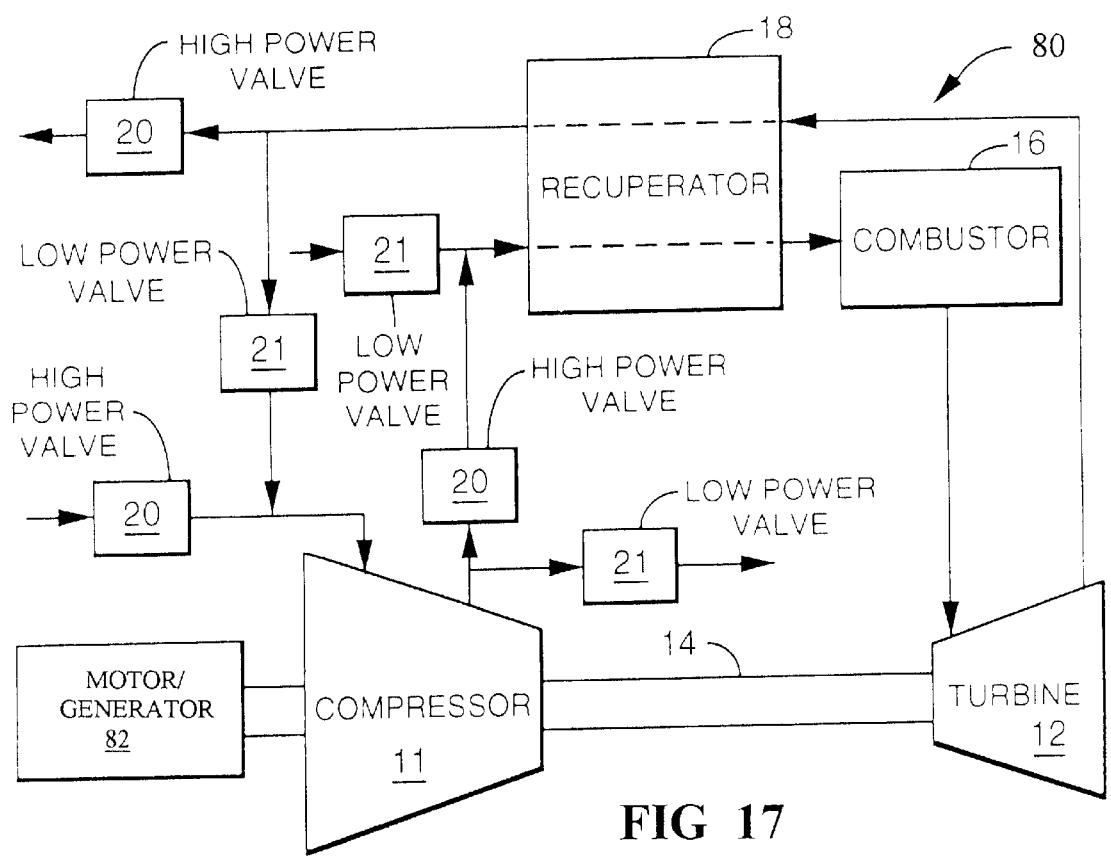
Figure 18:
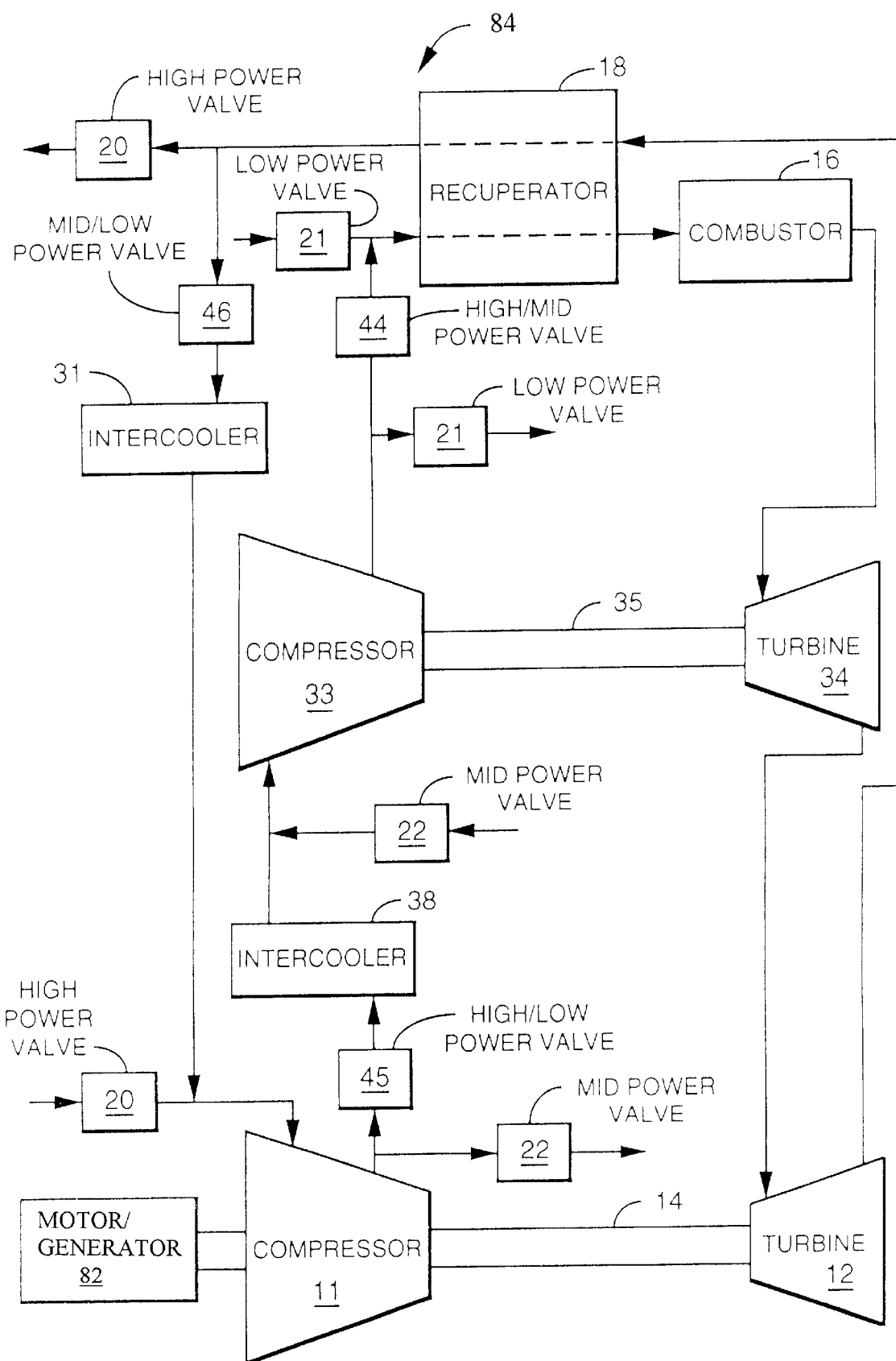
Figure 19:
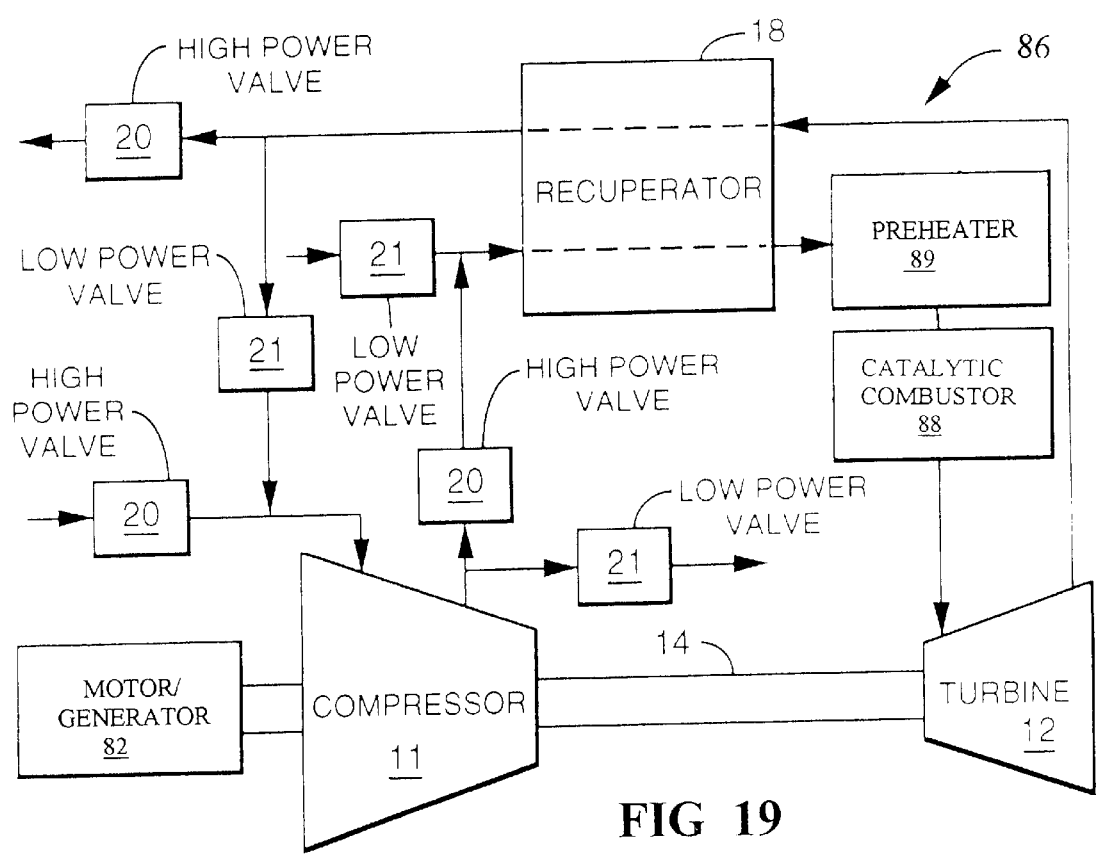
Figure 20:
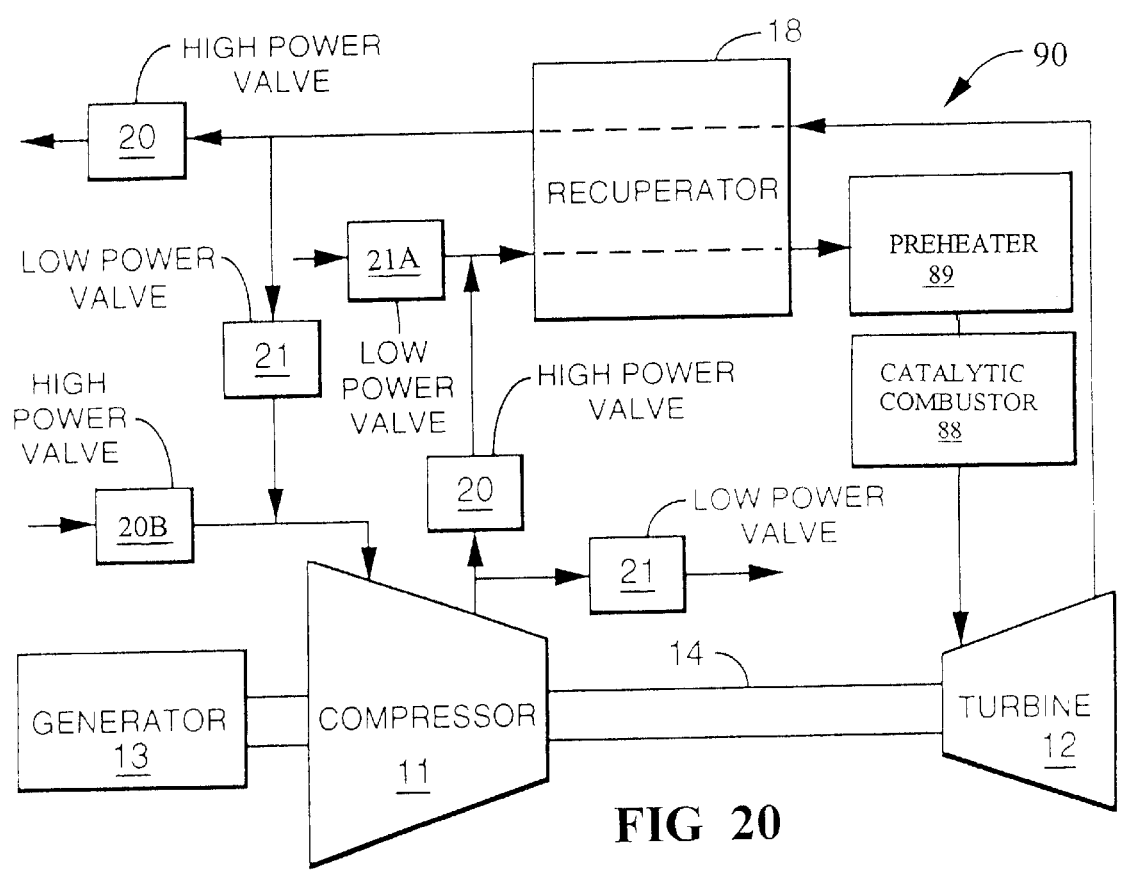
Figure 21:
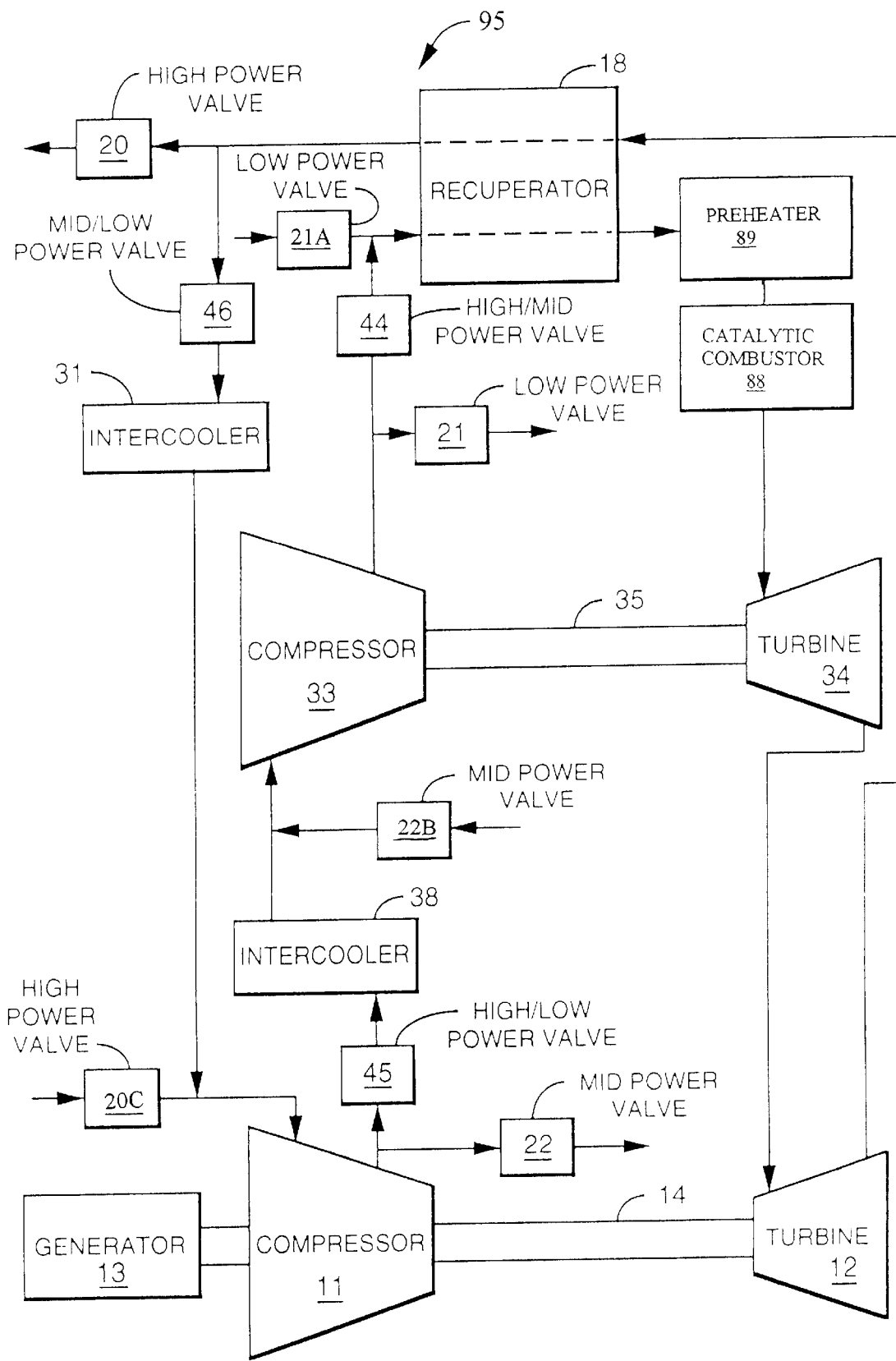

Having thus described the present invention in general terms, reference will now be made to the accompanying drawings in which:

FIG. 1 is a schematic block diagram of a positive pressure, recuperated, gas turbine;

FIG. 2 is a schematic block diagram of a subatmospheric pressure, recuperated, gas turbine;

FIG. 3 is a schematic block diagram of a multi pressure mode, single spool, gas turbine of the present invention;

FIG. 4 is a schematic block diagram of a multi pressure mode, single spool, intercooled, gas turbine of the present invention;

FIG. 5 is a schematic block diagram of a positive pressure, two spool, recuperated intercooled, gas turbine;

FIG. 6 is a schematic block diagram of a multi pressure mode, two spool, recuperated, intercooled, gas turbine of the present invention;

FIG. 7 is a schematic block diagram of a multi pressure mode, spool and one half, recuperated, gas turbine of the present invention with a free turbine;

FIG. 8 is a schematic block diagram of a multi pressure mode, spool and one half, recuperated, intercooled, gas turbine of the present invention with a free turbine;

FIG. 9 is a schematic block diagram of a multi pressure mode, two and one half spool, recuperated, intercooled gas turbine of the present invention;

FIG. 10 is a schematic block diagram of an alternate multi pressure mode, two and one half spool, recuperated, intercooled gas turbine of the present invention;

FIG. 11 is a schematic block diagram of the multi pressure mode gas turbine of FIG. 10 and having three way valves in a high power configuration;

FIG. 12 is a schematic block diagram of the multi pressure mode gas turbine of FIG. 10 and having three way valves in a mid power configuration;

FIG. 13 is a schematic block diagram of the multi pressure mode gas turbine of FIG. 10 and having three way valves in a low power configuration;

FIG. 14 is a schematic block diagram of the multi pressure mode gas turbine of FIG. 10 and having four way valves in a high power configuration;

FIG. 15 is a schematic block diagram of the multi pressure mode gas turbine of FIG. 10 and having four way valves in a mid power configuration;

FIG. 16 is a schematic block diagram of the multi pressure mode gas turbine of FIG. 10 and having four way valves in a low power configuration;

FIG. 17 is a schematic block diagram of a multi pressure mode, single spool, gas turbine of the present invention and having a motor/generator;

FIG. 18 is a schematic block diagram of a multi pressure mode, two spool, recuperated, intercooled, gas turbine of the present invention and having a motor/generator;

FIG. 19 is a schematic block diagram of a multi pressure mode, single spool, gas turbine of FIG. 17 and having a catalytic combustor;

FIG. 20 is a schematic block diagram of a multi pressure mode, single spool, gas turbine of the present invention and having a catalytic combustor; and FIG. 21 is a schematic block diagram of a multi pressure mode, two spool, recuperated, intercooled, gas turbine of the present invention and having a catalytic combustor.

DETAILED DESCRIPTION OF THE PREFERRED EMBODIMENTS

In order to understand the present invention, it is necessary to comprehend the various possible pressure operating modes of a gas turbine. Gas turbines that burn fuel must take in air for combustion and discharge the products of combustion. Thus, if fuel is burned inside the gas turbine, the cycle cannot be a closed loop and must be opened somewhere. The cycle can be opened in various places.

In a conventional, positive-pressure, recuperated gas turbine 10, as illustrated in FIG. 1, the compressor 11, turbine 12 and generator 13 are all on a common shaft 14. The compressor 11 compresses air for the combustor 16 after it has been heated in the recuperator 18. The heated compressed air is mixed with fuel in the combustor 16 where it is than ignited and burned. The combustion products are then expanded in the turbine 12 which drives the compressor 11 and generator 13. This cycle is opened between the discharge 15 from the low-pressure side of the recuperator 18 and the compressor inlet 17. Thus, ambient air, that may have been filtered, cooled or otherwise treated, enters the compressor 11 and the products of combustion are discharged out of the low-pressure side of the recuperator 18.

In the subatmospheric cycle gas turbine 19 illustrated in FIG. 2, ambient air enters the recuperator 18 where it is preheated before entering the combustor 16. The hot products of combustion leave the combustor 16 and discharge through the turbine 12 into a partial vacuum that is sustained by the compressor 11. Before entering the compressor 11, the hot gases are cooled by the recuperator 18 with the rejected heat being used to preheat the ambient air entering the recuperator 18. In some cases, the air leaving the low-pressure side of the recuperator 18 is further cooled with an intercooler (not shown) before entering the compressor 11. Cooling may be necessary since the amount of power that the compressor 11 takes and the amount of air that enters the compressor 11 are functions of the compressor inlet temperature. This cycle is open between the compressor outlet 30 and the inlet 37 to the high-pressure side of the recuperator 18.

A very important side effect of operating the gas turbine 19 subatmospherically is that the mass flow through the gas turbine 19 is reduced by a factor roughly equal to the pressure ratio, and maximum power is reduced by approximately the same ratio. Thus, as an example, although the basic system components are essentially the same in both cycles, if the pressure ratio is four to one, the maximum power of the gas turbine 19 operating subatmospherically (FIG. 2) will be roughly one quarter that of the same gas turbine 10 operating in a conventional positive pressure mode (FIG. 1).

Gas turbines (turbogenerators) that drive constant-speed loads such as conventional fixed-frequency generators cannot slow down at reduced loads because the compressor 11 and turbine 12 are geared to the generator 13 that must maintain constant speed to maintain constant frequency. At low loads, the fuel flow is reduced but the airflow is not. This results in low turbine inlet temperatures that result in low efficiencies.

If the load does not require constant speed, as when the output of the generator 13 is conditioned by an inverter (not shown), the gas turbine can be slowed down when the load is low resulting in much better part-load efficiency. However, if a load is suddenly applied, the gas turbine will be unable to meet the increased load until it has accelerated to the appropriate rpm. Thus the gas turbine must choose between operating at high rpm and having poor efficiency and operating at low rpm and being unable to meet a step load.

If the gas turbine could be transitioned rapidly between a subatmospheric pressure mode (FIG. 2) and a positive pressure mode (FIG. 1), this problem could be greatly ameliorated. The gas turbine could operate at high rpm in the subatmospheric pressure mode when the load is low and when the load is rapidly increased, the gas turbine could rapidly transition to the positive-pressure mode and meet the load since the gas turbine would already be at high rpm.

For purposes of illustration, a generator 13 has been shown as the load for the gas turbine. It should be recognized, however, that the load could be anything that is driven mechanically, hydraulically or pneumatically.

In its simplest form, the gas turbine 25 of the present invention is illustrated in FIG. 3. It is a shown as a single spool or rotor group machine, with the single spool including compressor 11, turbine 12 and generator 13. The gas turbine 25 includes three high power valves 20 and three low power valves 21 which are normally closed.

In the high power or positive-pressure mode, the high power valves 20 are open while in the low power or subatmospheric pressure mode, the low power valves 21 are open.

Referring to FIG. 3, with the high power valves 20 open, ambient air enters the compressor 11, goes through the recuperator 18, combustor 16, turbine 12 and low-pressure side of the recuperator 18 before exiting. However, if the load is low, the high power valves 20 close and the low power valves 21 open. The ambient air then enters the recuperator 18, goes through the cycle and is discharged to atmosphere out of the compressor 11. Power is reduced, mass flow is reduced, the gas turbine 25 operates at high rpm, and good efficiency is maintained. If a step load is suddenly applied, the gas turbine reverts to positive-pressure mode (high power valves open, low power valves closed) essentially instantaneously and handles the load.

It is important to note that the temperatures in the hot section of the gas turbine 25 including the recuperator 18, the combustor 16 and the turbine 12 are essentially unchanged during the transition. There is no thermal shock even though the loads have changed. It should also be noted that there is no change in rpm during the transition, thus minimizing any mechanical shock.

FIG. 4 illustrates a single spool gas turbine 26 which includes an intercooler 31 to provide additional cooling of the compressor inlet air between low pressure side of the recuperator 18 and the compressor 11.

A positive pressure, two spool, recuperated, intercooled, gas turbine is illustrated in FIG. 5. The first spool or rotor group includes compressor 11, turbine 12, and generator 13 on shaft 14. The second spool or rotor group includes compressor 33, turbine 34, and generator 41 on shaft 35.

Compressor 11 provides compressed air to compressor 33 through intercooler 38. The compressed air from compressor 33 is heated in recuperator 18 before being mixed with fuel and burned in combustor 16 which provides combustion products to turbine 34. The exhaust gases from turbine 34 are burned in combustor 43 before being expanded in turbine 12 whose exhaust proceed to recuperator 18.

The high-pressure rotor produces almost as much power as the low-pressure rotor. The mass flows are the same, give or take any bleed or the addition of any fuel. The pressure ratios are optimized to be the same. The turbine inlet temperatures are the same. The only significant difference is that the low-pressure compressor 11 sees ambient temperature air while the high-pressure rotor compressor 33 sees air at a slightly elevated temperature because the intercooler is not 100% effective. If the low-pressure compressor 11 sees an air inlet temperature of 15° C. (59° F.), then the high-pressure compressor 33 might see an air inlet temperature of 25° C. (77° F.). Then, if the low-pressure rotor group produces 74.3 kW, the high-pressure rotor group should produce 70.9 kW for a total of 145.2 kW.

The key point is that doubling the number of spools or rotors has essentially doubled the power but there is still only one recuperator 18, the most expensive component in the system. Thus the specific cost is lower. While an intercooler 38 has been added, it is essentially the same as a turbocharger aftercooler and is far less expensive to build than a high temperature recuperator.

The original objective of the recuperator 18 was to raise the temperature of the compressor discharge air to as close to the turbine discharge temperature as possible, thus reducing the amount of fuel required by the combustor 43. The air entering the combustor 43 for the low-pressure rotor is, however, already at the turbine discharge temperature. So the low-pressure rotor operates with the thermodynamic equivalent of a 100% effective recuperator 18. Thus the low-pressure, 74.3 kW rotor now operates with a theoretical efficiency of thirty-eight and three tenths percent (38.3%) whereas the 70.9 kW, high-pressure rotor operates with the original theoretical efficiency of thirty-one and one half percent (31.5%). Thus the total theoretical efficiency, weighted for power output, is thirty-five percent (35.0%). The net result is that the efficiency of the recuperated intercooled gas turbine will be substantially more than that of a conventional recuperated gas turbine.

FIG. 6 illustrates a two-spool or two rotor group gas turbine 32 of the present invention. It should be noted that the gas turbine 32 does not include combustor 43 between turbine 12 and turbine 34. Likewise, the second spool or rotor group of shaft 35 does not include a generator. The gas turbine 32 operates with the high power valves 20, high/mid power valve 44, and high/low power valve 45 all open for high power with both rotor groups operating in the positive-pressure mode. As the load is reduced, the mid power valves 22 and mid/low power valve 46 are opened and the high power valves 20 and high/low power valve 45 are closed with high/mid power valve 44 remaining open. In this configuration, gas turbine 32 operates in the mid power or transatmospheric pressure mode.

Air enters between the two compressors 11, 33 and the upper rotor group of shaft 35 operates positive-pressure while the lower rotating group of shaft 14 operates subatmospherically. Both rotor groups have their mass flow reduced by a factor roughly equal to the pressure ratio of the compressor 11 with a corresponding reduction in power.

If the load drops further, the mid power valves 22 and the high/mid power valve 44 are closed and the low power valves 21 and high/low power valve 45 are opened with mid/low power valve 46 remaining open. In this case both rotor groups now operate subatmospherically with a further reduction in power.

While it is accurate to state that the gas turbine operates in a subatmospheric pressure mode of less than one atmosphere, it is recognized that a miniscule amount of positive pressure is necessary to allow the compressor to discharge into the atmosphere. Also, while it is accurate to state that the gas turbine operates in a transatmospheric pressure mode, it is recognized the high pressure turbine discharge and the low pressure turbine inlet may be at either a positive pressure or a subatmospheric pressure. The high pressure turbine inlet will be at a positive pressure and the low pressure turbine discharge will be at a subatmospheric pressure.

Thus, there are three modes with three separate power levels at which high efficiency can be obtained. If, as an example, the pressure ratio of each of the compressors was four to one, close to full efficiency could be achieved at 100% power, 25% power and 6¼% power. Yet the transition between operating at these powers would be essentially instantaneous. This configuration not only increases efficiency but also reduces the equipment cost per horsepower. The fact that the equipment cost per horsepower is reduced is derived from the use of a second spool to increase power without adding recuperator surface as well as the ability to increase turbine inlet temperature without recuperator-imposed limitations.

In essence, the original rotor group (the low-pressure rotor) is turbocharged or supercharged by the second spool or rotor group (the high-pressure rotor) in series with the original rotor group. An intercooler 38 is placed between the two compressors 11, 33 because the power required to compress air is a function of temperature. The high-pressure rotor is smaller than the low-pressure rotor as it sees a much smaller volume of air because the air is compressed.

As previously stated, the turbine inlet temperature is limited because the turbine discharge temperature must not be too high for the recuperator. This limitation is now eliminated for the high pressure rotor since the turbine discharges into a combustor inlet rather than into the recuperator. Therefore, it is now feasible to increase the turbine inlet temperature of the high pressure rotor by increasing the fuel flow into the high pressure combustor. Increasing the turbine inlet temperature of the high pressure rotor by 100° C. (180° F.) from 875° C. (1607° F.) to 975° C. (1787° F.) increases the power of the high pressure rotor from 70.9 kW to 86.5 kW.

While this 15.6 kW increase in power is accompanied by an increase in fuel flow of 64.2 kg cal/hr (255 kBtu/hr), the turbine discharge temperature is increased from 602° C. (1116° F.) to 683° C. (1261° F.). As the turbine discharges directly into the low pressure combustor, the low pressure combustor sees a higher combustor inlet temperature and thus needs less fuel to meet the required low pressure turbine inlet temperature. In simple terms, the energy in the additional fuel is converted into additional turbine power and into additional turbine exhaust heat. Since the additional turbine exhaust heat reduces the amount of fuel required by the low pressure combustor on a one-for-one basis, the net incremental fuel of both combustors is only increased by the amount of energy that is converted into additional turbine power. In other words, the additional fuel consumed is converted at essentially 100% efficiency into useful power, give or take the small amount of heat that is radiated or conducted away.

Unfortunately, there is a limit to the temperature that the turbine can take and this limit is being rapidly approached for uncooled metal turbine wheels. Unfortunately, the turbine wheel in a typical microturbine is too small for blade cooling. The answer is ceramics. The high-pressure rotor is small and is conceptually similar to that of a turbocharger. Small ceramic turbochargers have been built for vehicular applications in quantities of hundreds of thousands.

The rationale for ceramic turbochargers was not primarily to allow for higher inlet temperatures. The first goal was to reduce the rotating weight, thus eliminating "turbo lag" and permitting the turbocharger to accelerate rapidly. The second goal was to reduce the mass and therefore the energy in the event of a wheel failure. One of the most expensive parts in a turbocharger is the turbine housing, which must offer containment. Reducing the energy in the wheel allows for a lighter and less expensive housing. Both of these attributes would also be helpful in a microturbine. However, the most important thing would be the ability to handle high temperatures.

Using a ceramic turbine wheel and raising the turbine inlet temperature to 1214° C. (2217° F.) would increase the high-pressure turbine discharge temperature to 875° C. (1607° F.) thus eliminating any low-pressure combustor. More important, the power produced by the high-pressure rotor would be 125.5 kW. Added to the 74.3 kW output of the low-pressure rotor, the total output would be 199.8 kW, which rounds to 200 kW. Fuel consumption in what is now the only combustor would be 428.3 kg cal/hr (1700 kBtu/hr) for an efficiency of forty and one tenth percent (40.1%).

A one and one half spool gas turbine 28 is shown in FIG. 7. The gas turbine 28 includes a half spool or rotor group which includes free turbine 23 and generator 24 on a common shaft 27. The one half spool is separate from the spool or rotor group which includes compressor 11 and turbine 12. FIG. 8 is a one and one half spool gas turbine 29 which includes intercooler 31.

The free turbine 23 enables the gas turbines 28, 29 to handle step loads without external stored energy. Separate turbines 12, 23 are thus used to power the compressor 11 and the generator 24, respectively. These separate turbines 12, 23 are independent and operate at different and varying speeds. The first turbine 12 and the compressor 11 that it powers form the core of the gas producer section of either of gas turbines 28, 29. The turbine providing the output power is the free turbine 23.

If a step load is suddenly applied, the gas producer section is free to accelerate rapidly, unconstrained by the load on the generator 24. Typically, the gas producer in a small gas turbine might accelerate from idle to maximum power in perhaps five seconds or roughly 20% of full power per second. In the meantime, the generator 24 does provide the needed electricity for a brief period by using its own inertia along with that of the power turbine 23 to provide the power while it is slowing down. Fortunately the torque curve of a power turbine 23 is such that torque increases dramatically as it slows down. Typically stall torque will be 2½ or more times the full-load torque. The mass and speed of the power turbine 23 and generator 24 will determine how many seconds at what power are available. In effect, the power turbine 23 and generator 24 act as a flywheel to handle step loads. A key point is that even if the generator 24 is overloaded, the gas turbine cannot be stalled or damaged.

One major positive aspect to free turbines is the ease with which they can be used for mechanical propulsion. The ability to run with a mechanical drive, as virtually all vehicular gas turbine have done in the past, is important. Free turbines have the equivalent of a built in torque converter. As noted above, the stall torque is typically more than 2½ times the torque at full power. A typical free turbine can deviate plus or minus 25% from maximum power rpm and only lose 5% of its output power.

Two and one half spool gas turbines 48 and 36 are illustrated in FIGS. 9 and 10, respectively. The two and one half spool gas turbines essentially combines the one and one half spool gas turbines 28, 29 of FIGS. 7 and 8, with the two spool gas turbine 32 of FIG. 6.

In FIG. 9, the free turbine 23 is between the high pressure turbine 34 and the low pressure turbine 12 in receiving the combustion products from the combustor 16. In FIG. 10 the high pressure turbine 34 receives the combustion products from combustor 16, exhausts to the low pressure turbine 12 which is turn exhausts to the free turbine 23 before the combustion products are provided to recuperator 18.

While FIGS. 3–4 and 6–10 illustrate the use of discrete valves, it should be recognized that the number of valves can be reduced by combining valves into three-way or four-way valves. Gas turbine 40 of FIGS. 11–13 illustrates the use of three-way valves in a high power, mid power, and low power configuration, respectively. FIGS. 14–16 illustrates gas turbine 42 having four-way valves in a high power, mid power, and low power configuration, respectively.

For the purpose of this patent application, we define a three-way valve as one in which the flow passage is open between two of three openings with the third opening sealed shut, and that the valve can alternate between these two openings to determine which one is open and which is shut. The use of three-way valves can reduce the number of valves from nine open/close valves to four three-way valves 50, 51, 52, and 53 plus two open/close valves, namely low pressure valve 21 and mid pressure valve 22, as shown in FIGS. 11–13.

The valves are shown as pivoting arrowheads or tails, which will move up or down (or right or left) as required. These valves would always be in one of the extreme positions unless the valves were in transition. In the high, medium and low power settings, they would connect to H, M or L, respectively. The open/shut valves labeled M and L would be normally closed and opened only for medium or low power settings, respectively.

In the high power configuration of FIG. 11, air enters compressor 11 through three-way valve 52 and exhaust gas leaves the gas turbine 40 through three-way valve 50. In the mid power configuration of FIG. 12, air enters through open/close valve 22 while the compressor 11 discharges air through the same three-way valve 53. In the low power configuration of FIG. 13, air enters recuperator 18 through three-way valve 51 and is discharged from compressor 33 through open/close valve 21.

For the purpose of this patent application, we define a four-way valve as one in which the flow passage is open between two of three openings as in the three-way valve, but the third opening is connected to atmosphere. As with the three-way valve, the four-way valve can alternate between these two openings to determine which two are connected while the remaining opening is connected to the atmosphere. The use of four-way valves can reduce the number of valves from nine open/close valves to four four-way valves 60, 61, 62, and 63 as shown in FIGS. 14–16.

The control of a microturbine is generally described in U.S. Pat. No. 6,023,135 issued Feb. 8, 2000 to Mark G. Gilbreth et al. and entitled "Turbogenerator/Motor Control System" and U.S. Pat. No. 6,031,294 issued Feb. 29, 2000 to Everett R. Geis et al. and entitled "Turbogenerator/Motor Controller with Ancillary Energy Storage", both of which are incorporated herein by reference.

The control of the gas turbine 42 of FIGS. 14–16 is relatively simple. Based upon information from the generator 24 (or elsewhere in the gas turbine), the control 56 provides a fuel signal 65 to the fuel valve 55 to adjust fuel flow as required, plus operational commands or signals 66, 67, 68, 69 to four-way valves 60, 61, 62, 63 respectively.

In the multi pressure mode gas turbine 42 of FIGS. 14–16, if more power is needed, the appropriate four-way valves are triggered to increase gas turbine pressure. If the power demand is such that the gas turbine can provide the power demand at a lower gas turbine pressure, the appropriate valves are triggered to decrease gas turbine pressure. Other than the shifting of valve positions to change gas turbine pressure, the control of a multi pressure mode gas turbine 42 is substantially identical to the control of any single pressure or conventional gas turbine regardless of whether it is free turbine or fixed shaft.

In the high power position, the operation is the same as with the three-way valves. In the medium power position, the operation is also the same, except that the ambient air now enters through the opening labeled HL that is now connected to the atmosphere. Correspondingly, in the low power setting, the air exits through the passage labeled HM that is now connected to the atmosphere.

Further, it should be noted that additional rotor groups can be used with the same arrangement of valves to further increase the number of power levels at which high efficiency can be achieved. Also, there are no simply discrete points at which high efficiency can be achieved. In each mode, the gas turbine can operate at any power setting up to the maximum for that mode at a higher efficiency than it would have in any of the higher pressure modes.

While the free turbine goes a long ways towards solving the step load problem, it simply cannot handle an instantaneous step from very low loads to full load. This is where the transatmospheric pressure and subatmospheric pressure operating cycle comes in.

Whether a gas turbine runs in the conventional positive-pressure mode, the transatmospheric pressure mode, or the subatmospheric pressure mode, the hardware is essentially the same. The differences lie in where ambient air enters the cycle and where the combustion products are discharged. If ambient air enters the cycle either between the compressors or at the recuperator inlet, the cycle pressure and mass flow will be lower as opposed to the air entering the cycle in the conventional manner upstream of the compressor. Thus the power developed will be correspondingly less.

One disadvantage to the transatmospheric pressure cycle and the subatmospheric pressure cycle is that one or both of the compressors must compress the products of combustion. A second disadvantage is that these products do not enter one or both of the compressors at ambient temperature. However, in the subatmospheric pressure cycle, the air entering the recuperator on the cold side is at ambient temperature instead of at compressor discharge temperature as it would be in a conventional cycle. Accordingly, the recuperator can be quite effective in cooling the combustion products before they enter the compressor. In addition, an intercooler can be added.

If the interstage pressure between the two spool compressors could be reduced to atmospheric then the high-pressure spool or rotor would be operating at positive but dramatically reduced pressure and the low-pressure spool or rotor would be operating subatmospherically. Assuming that the individual compressor pressure ratios were 4:1, the mass flow would be reduced by a factor of four and therefore the maximum cycle power would be achieved with high efficiency at 25% of normal full power. Equally important, the rotor groups would be operating at full rpm at 25% power.

If the gas turbine could be operated in the full subatmospheric pressure mode where the highest pressure in the cycle is atmospheric, the power would drop by a further factor of four. Maximum cycle power would theoretically be achieved at 6¼% of normal full power. Relatively high efficiency would also be achieved at this power setting. Thus, if the gas turbine were rated at 200 kW (267 hp), it should have full efficiency at 200 kW (267 hp), and reasonably close to full efficiency at 50 kW (67 hp) and 12½ kW (17 hp). It is easy to image a bus creeping through city traffic with loads varying as air conditioning and other accessories cycle on and off, and then suddenly requiring power for acceleration. Keeping the rpm up is the key to handling these step loads. If the microturbine can transition between the various modes, then it can operate at low loads efficiently and still be able to handle step loads.

As a practical matter, the parasitic losses will remain about the same for all three modes and constitute a higher percentage of the cycle power in the reduced-pressure modes. However, parasitic losses are relatively low in machines that use compliant foil fluid film bearings, have no engine-driven accessories, and require no gears. Another consideration is that, as noted above, one or both of the compressors will see products of combustion and higher inlet temperatures in the reduced-pressure modes.

Fast acting high pressure valves of the type required for the operation of this invention are commercially available and have been used extensively in systems such as aircraft pneumatic actuation systems, including engine thrust reverser actuation systems, nozzle controls, flap actuation systems, weapon ejection systems and gun drive systems. In addition, pneumatic actuated turbocharger bypass valves would also be suitable.

The transition time between operating in the various pressure modes will be as fast as the valves can operate. Note that in transitioning between modes, there is no significant change in temperature anywhere in the cycle even though the change in power is dramatic.

Microturbines must be able to handle situations where the load is instantly lost. This can be as simple as the main breaker opening unexpectedly or the driver going into regenerative braking mode. Either way, the stored heat in the recuperator wants to accelerate the unloaded microturbine, generally requiring either braking resistors or bleed valves. With the ability to switch instantaneously to subatmospheric pressure operation, the power needing to be dissipated is reduced by a factor of at least sixteen.

The gas turbines of the present invention can have an efficiency over 40% from fuel-in to useful electricity-out. Close to this efficiency can be achieved over a wide range including very low power outputs. Severe step loads can be handled with ease. Yet the cost per kW of such a machine should be much less than that of existing microturbines. The result is substantially increased part-load efficiency and/or a substantially reduced response time to a step load.

A further aspect of this invention is the ability to substantially reduce the power and energy required to start the gas turbine. The starting device, which can be a motor, must provide sufficient power to accelerate one or more rotor groups at an acceptable rate to a self-sustaining speed. This starting device will be assisted by the power produced by the turbine wheel but this power will be minimal until fuel is added to the combustor and ignited, thus providing hot gases and energy to the turbine wheel.

The compressor is the largest load to be overcome although there are secondary parasitic loads such as bearings, gears and accessories. The power absorbed by the compressor is a direct function of the mass flow, and the mass flow can be reduced during starting by setting the valves to operate in the lower or the lowest pressure mode. This reduces both the power and the energy required to start the gas turbine.

FIG. 17, illustrates a multi pressure mode, single spool, gas turbine 80 which includes motor/generator 82. The motor/generator 82 acts as a motor to start the gas turbine 80 during the starting process and then acts as a generator to produce electricity while the generator set is running. If the pressure ratio of the compressor in this gas turbine were 4:1, then the power absorbed by the compressor would be reduced by a factor of approximately four by starting in the lower pressure mode.

FIG. 18 illustrates a multi pressure mode, two spool, recuperated intercooled gas turbine 84 including motor/generator 82. In this two rotor gas turbine 84, the motor/generator 82 acts as a motor to start the gas turbine during the starting process, and then acts as a generator to produce electricity while the generator set is running. If the pressure ratio for the compressors in each of the rotors in this gas turbine were 4:1 for a total of 16:1, then the total power absorbed by the compressors would be reduced by a factor of approximately sixteen by starting in the lowest pressure mode.

If a gas turbine uses a catalytic combustor instead of a conventional combustor there will be special problems in starting. In a conventional combustor, fuel can be added to the air in the combustor and ignited by a spark or hot surface with light off being essentially instantaneous. A catalytic combustor, however, will not work until the catalyst is hot. During normal operation, the catalyst is kept hot by the heat of the reaction within the combustor. However, to get it started, the catalyst must be heated by other means.

Various means of preheating the catalyst for starting have been proposed. One of these is the use of fuel-fired heaters located between the turbine discharge and the recuperator hot-side inlet as described in U.S. Pat. No. 4,754,607 issued on Jul. 8, 1988 to the same inventor as this application. The most common means are electric heaters or fuel-fired heaters usually located upstream of the catalyst as shown in FIG. 19 where gas turbine 86 includes motor/generator 82, catalytic combustor 88, and preheater 89.

Heating the catalyst electrically requires large heating elements and a substantial power supply because while the catalyst is being heated by resistance heat, it is also being cooled by the flow of air going through it while the rotor is being accelerated to its sustaining speed. If this airflow is reduced, there will be far less cooling thus reducing the required size of both the heating elements and the power supply. Starting the gas turbine with the valves set to operate in the lower or lowest pressure modes reduced the airflow in the examples shown above by factors of four and sixteen respectively. Correspondingly, if the catalyst is heated with a fuel-fired combustor, the size of the combustor can be reduced if the gas turbine is started with the valves set to operate in the lower or lowest pressure mode.

One of the rationales for using a catalytic combustor is to eliminate the need for a fuel gas compressor when the fuel is gaseous. Conventional combustors in conventional gas turbines operate with pressures of several atmospheres in the combustor. Therefore, the fuel must be at an even higher pressure if it is to flow into the combustor. This mandates the use of an expensive, energy-consuming fuel gas compressor. If the fuel could be mixed with the air before entering the gas turbine's air compressor, the air compressor could compress both the air and the gaseous fuel simultaneously thus eliminating the need for a separate fuel gas compressor. Unfortunately, the resulting mixture would be too lean to burn in a conventional combustor. Accordingly, when a conventional combustor is used, the fuel is mixed with only a portion of the air resulting in a combustible mixture that is burned in the primary zone of the combustor and the remaining air is used for cooling and dilution.

With a catalytic combustor, the fuel can be introduced at the gas turbine's air compressor inlet and compressed along with the air because the catalyst will react with extremely low fuel to air ratios. Thus no fuel gas compressor is needed when operating.

This, however, leads to the problem of how to get it started. If a gaseous fuel is used in a fuel-fired preheater to heat the catalyst in a conventional positive pressure gas turbine, the gas must be compressed and a fuel gas compressor will be needed. By starting the gas turbine in a mode where the combustor is at or below atmospheric pressure, the preheater can operate with gaseous fuel at essentially atmospheric pressure and no fuel-gas compressor is needed. After the catalyst is operating and the gas turbine is running, the gas turbine can transition to the higher-pressure, higher power modes.

FIG. 20 illustrates a single rotor gas turbine 90 with a catalytic combustor 88 and preheater 89 where the fuel and combustion air are input through low power valve 21A during startup and during low power operation. When the gas turbine 90 is running and transitions to high power operation, the fuel and combustion air are turned off through low power valve 21A and simultaneously turned on through high power valve 20B.

FIG. 21 shows a dual rotor gas turbine 95 with a catalytic combustor 88 and preheater 89. The fuel and combustion air are inputted through low power valve 21A during startup and during low power operation. When the gas turbine is running and transitions to mid power operation, the fuel and combustion air are turned off through low power valve 21A and simultaneously turned on through mid power valve 22B. When the gas turbine is running and transitions to high power operation, the fuel and combustion air are turned off through mid power valve 22B and simultaneously turned on through high power valve 20C.

While specific embodiments of the invention have been illustrated and described, it is to be understood that these are provided by way of example only and that the invention is not to be construed as being limited thereto but only by the proper scope of the following claims.

What I claim is:

1. A method of operating a recuperated gas turbine, comprising:
   providing valving between the recuperator and the gas turbine compressor;
   at start up and at low power, setting the valving to operate the gas turbine in a subatmospheric pressure mode; and
   at high power, setting the valving to operate the gas turbine in a positive pressure mode.

2. The method of operating a recuperated gas turbine of claim 1, and in addition, intercooling the recuperated air delivered to the gas turbine compressor.

3. The method of operating a recuperated gas turbine of claim 1, and in addition, setting the valving to operate the gas turbine in a transatmospheric pressure mode at mid power between high power and low power.

4. The method of operating a recuperated gas turbine of claim 3, and in addition, intercooling the recuperated air delivered to the gas turbine compressor.

5. The method of operating a recuperated gas turbine of claim 1 wherein the recuperated gas turbine has a single spool.

6. The method of operating a recuperated gas turbine of claim 1 wherein the recuperated gas turbine has a spool and a half.

7. The method of operating a recuperated gas turbine of claim 1 wherein the recuperated gas turbine has two spools.

8. The method of operating a recuperated gas turbine of claim 1 wherein the recuperated gas turbine has two and one half spools.

9. The method of operating a recuperated gas turbine of claim 1 wherein the recuperated gas turbine includes a free turbine.

10. The method of operating a recuperated gas turbine of claim 1 wherein the combustor is a catalytic combustor.

11. The method of operating a recuperated gas turbine of claim 10 wherein the catalytic combustor includes a preheater.

12. The method of operating a recuperated gas turbine of claim 3 wherein the combustor is a catalytic combustor.

13. The method of operating a recuperated gas turbine of claim 12 wherein the catalytic combustor includes a preheater.

14. A turbogenerator comprising:
   a gas turbine including a compressor, a turbine, a combustor, a recuperator and a generator;
   said recuperator receiving compressed air from said compressor to be heated in said recuperator by the expanded exhaust gases from said turbine,
   said heated compressed air from said recuperator supplied to said combustor to be mixed with fuel and combusted to provide combustion gases for expansion in said turbine which drives said compressor and said generator;
   valving disposed between said recuperator and said compressor to start said gas turbine in a subatmospheric pressure mode, to operate said gas turbine in a subatmospheric pressure mode at low power, and to operate said gas turbine in a positive pressure mode at high power.

15. The turbogenerator of claim 14 wherein said generator is a motor/generator which is operated as a motor during start up of said gas turbine.

16. The turbogenerator of claim 14 wherein said combustor is a catalytic combustor including a preheater.

17. The turbogenerator of claim 14 wherein said valving is a plurality of open/close valves.

18. The turbogenerator of claim 14 wherein said valving includes a plurality of multiple-way valves.

19. A turbogenerator comprising:
   a gas turbine including a compressor, a turbine, a catalytic combustor with a preheater, a recuperator and a generator;
   said recuperator receiving compressed air from said compressor to be heated in said recuperator by the expanded exhaust gases from said turbine,
   said heated compressed air from said recuperator supplied to said preheated combustor to be mixed with fuel and combusted to provide combustion gases for expansion in said turbine which drives said compressor and said generator;
   valving disposed between said recuperator and said compressor to operate said gas turbine in a subatmospheric pressure mode at start up and at low power, and to operate said gas turbine in a positive pressure mode at high power.

20. The turbogenerator of claim 19 wherein said valving additionally includes means to operate the gas turbine in a transatmospheric pressure mode in a mid power between low power and high power.

* * * * *